(12) United States Patent
Garvin

(10) Patent No.: US 11,987,385 B2
(45) Date of Patent: *May 21, 2024

(54) AERIAL VEHICLE IMAGE CAPTURING SYSTEMS

(71) Applicant: Kyle Garvin, Everett, WA (US)

(72) Inventor: Kyle Garvin, Everett, WA (US)

( * ) Notice: Subject to any disclaimer, the term of this patent is extended or adjusted under 35 U.S.C. 154(b) by 513 days.

This patent is subject to a terminal disclaimer.

(21) Appl. No.: 17/233,810

(22) Filed: Apr. 19, 2021

(65) Prior Publication Data

US 2021/0316881 A1  Oct. 14, 2021

Related U.S. Application Data

(63) Continuation of application No. 16/025,780, filed on Jul. 2, 2018, now Pat. No. 10,981,670.

(Continued)

(51) Int. Cl.
| | |
|---|---|
| *B64D 47/08* | (2006.01) |
| *B64C 27/00* | (2006.01) |
| *B64C 39/02* | (2023.01) |
| *B64U 30/20* | (2023.01) |
| *B64U 101/30* | (2023.01) |

(Continued)

(52) U.S. Cl.
CPC ............ *B64D 47/08* (2013.01); *B64C 27/001* (2013.01); *B64C 39/024* (2013.01); *G03B 15/006* (2013.01); *G03B 37/04* (2013.01); *H04N 23/51* (2023.01); *H04N 23/698* (2023.01); *B64U 30/20* (2023.01); *B64U 2101/30* (2023.01)

(58) Field of Classification Search
CPC ..... B64D 47/08; B64C 27/001; B64C 39/024; G03B 15/006; G03B 37/04; H04N 23/51; H04N 23/698; B64U 30/20; B64U 2101/30; B64U 10/13
See application file for complete search history.

(56) References Cited

U.S. PATENT DOCUMENTS 6,141,034 A * 10/2000 McCutchen ........... G02B 13/06
                                                       348/E13.058
10,981,670 B2 * 4/2021 Garvin .................... H04N 23/51
(Continued)

FOREIGN PATENT DOCUMENTS

CN  105775151 A  *  7/2016
CN  106043722 A  * 10/2016
(Continued)

*Primary Examiner* — Daniel Pihulic

(57) ABSTRACT

A method, system, apparatus, and/or device for capturing images is disclosed. An example embodiment comprises a first image capturing device mounted to a mounting structure; a second image capturing device mounted to the mounting structure; and a third image capturing device mounted to the mounting structure, wherein the first image capturing device, the second image capturing device, and the third image capturing device are arranged in an octahedral array for capturing a 360 degree image, wherein the first image capturing device, the second image capturing device, and the third image capturing device face outward from a center of an octahedral shape that defines the octahedral array, and wherein image data captured by the first image capturing device, the second image capturing device, and the third image capturing device are combined to generate the 360 degree image.

18 Claims, 15 Drawing Sheets

Related U.S. Application Data

(60) Provisional application No. 62/527,335, filed on Jun. 30, 2017.

(51) Int. Cl.
*G03B 15/00* (2021.01)
*G03B 37/04* (2021.01)
*H04N 23/51* (2023.01)
*H04N 23/698* (2023.01)

(56) References Cited

U.S. PATENT DOCUMENTS

| | | | | |
|---|---|---|---|---|
| 2017/0313441 A1* | 11/2017 | Tsai | .................. | B64D 47/08 |
| 2019/0002124 A1* | 1/2019 | Garvin | .................. | B64U 10/13 |
| 2021/0316881 A1* | 10/2021 | Garvin | .................. | H04N 23/51 |

FOREIGN PATENT DOCUMENTS

| | | | | | |
|---|---|---|---|---|---|
| CN | 106114883 A | * | 11/2016 | | |
| CN | 205891273 U | * | 1/2017 | | |
| CN | 206265308 U | * | 6/2017 | | |
| CN | 109691095 A | * | 4/2019 | ........... | G02B 27/017 |
| WO | WO-2017076837 A1 | * | 5/2017 | ............. | B64C 27/08 |
| WO | WO-2019006463 A1 | * | 1/2019 | ........... | B64C 27/001 |

* cited by examiner

AERIAL VEHICLE IMAGE CAPTURING SYSTEMS

CROSS-REFERENCE TO RELATED APPLICATION

This application is a Continuation Application of, and claims the benefit of, co-pending U.S. Non-Provisional application Ser. No. 16/025,780, filed on Jul. 2, 2018, which claims the benefit of U.S. Provisional Application No. 62/527,335, filed Jun. 30, 2017, all of which are incorporated by reference herein in their entirety.

BACKGROUND

Aerial vehicles such as unmanned aerial vehicles (UAVs) can be used for performing surveillance, reconnaissance, and exploration tasks for military and civilian applications. The aerial vehicles may carry a payload configured to perform a specific function. For example, the aerial vehicles may include sensors to capture images of the environment surrounding the aerial vehicles. In some instances, it may be desirable to obtain panoramic images using the aerial vehicles.

SUMMARY

An example embodiment comprises a first image capturing device mounted to a mounting structure; a second image capturing device mounted to the mounting structure; and a third image capturing device mounted to the mounting structure, wherein the first image capturing device, the second image capturing device, and the third image capturing device are arranged in an octahedral array for capturing a 360 degree image, wherein the first image capturing device, the second image capturing device, and the third image capturing device face outward from a center of an octahedral shape that defines the octahedral array, and wherein image data captured by the first image capturing device, the second image capturing device, and the third image capturing device are combined to generate the 360 degree image.

DETAILED DESCRIPTION

Figure 1A:
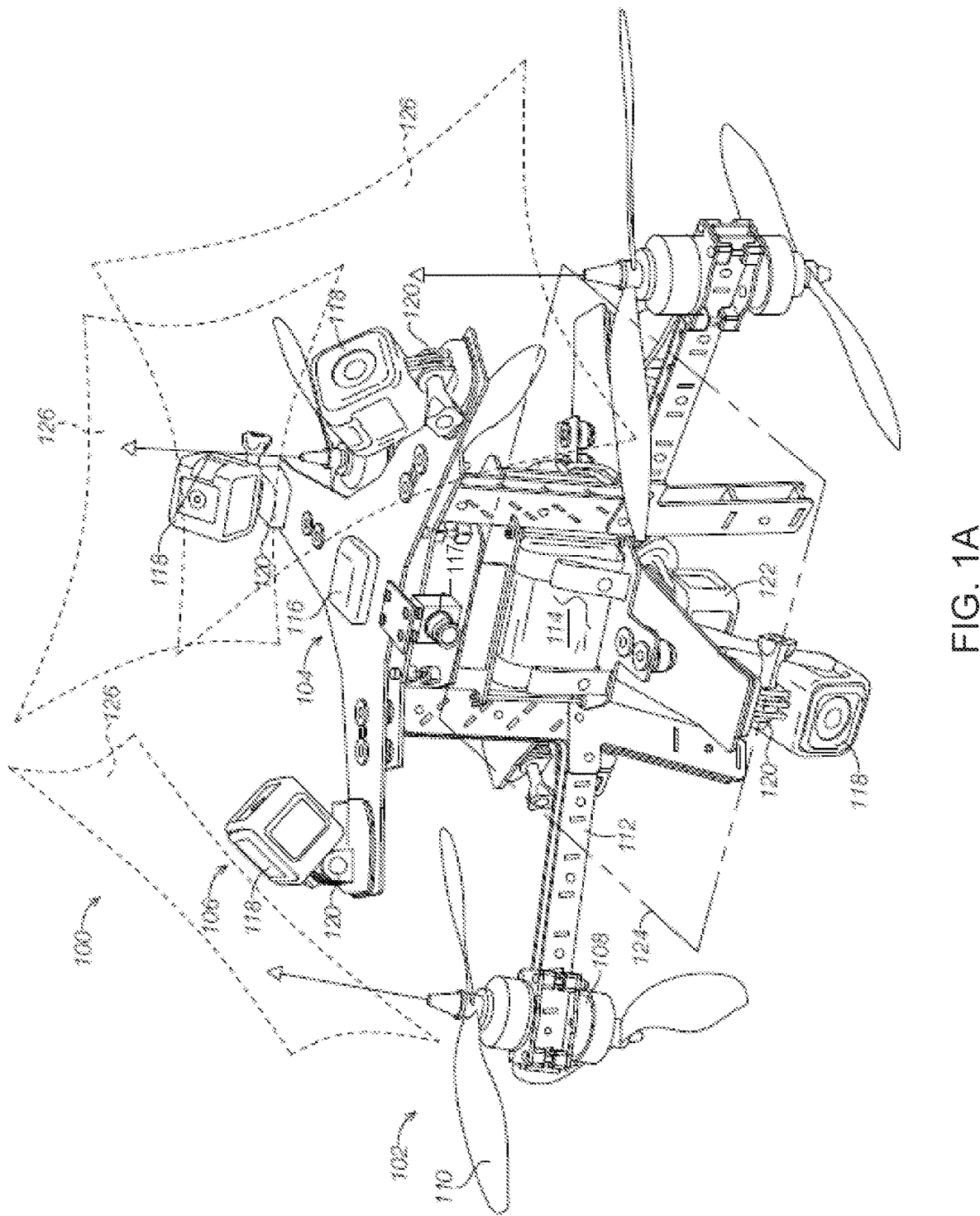
FIG. 1A illustrates an aerial vehicle image capturing system, according to an embodiment.

The disclosed aerial vehicle image capturing systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of aerial vehicle image capturing system examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Many individuals use image capturing devices to record still images and or videos. An image capturing device is an optical instrument for recording and/or capturing images, which may be stored locally, transmitted to another location, or both. The images may be individual still photographs or sequences of images aggregated to form videos or movies. The image capturing device is a remote sensing device as it senses subjects without physical contact. In one example, image capturing devices may be handheld which may cause images to be shaky which renders undesirable quality. In another example, image capturing devices may be mounted to remote devices that may be remotely controlled to capture images at some distance from individuals. For example, an unmanned aerial vehicle (UAV) may be a remote device that may fly at some distance from the individual and include a remote image capturing device system that captures images as directed by the individual.

The captured images may be standard images or panoramic images. Conventionally, to capture and generate panoramic aerial images using a UAV, the UAV may fly a predetermined flight path as an onboard image capturing device captures multiple images of the surrounding environment. The captured images are then transmitted from the UAV to a ground station or other remote devices, where the images may be digitally stitched or spliced together to generate a panoramic image.

The conventional image capturing systems for UAVs may result in captured images with a variety of quality issues. For example, conventional image capturing devices and accessories may vibrate as the UAV maneuvers around in the air. The vibrations may cause the image capturing device to capture blurry or lower quality images. In another example, the blades, the propellers, or the booms of UAVs in conventional image capturing systems may obstruct at least a portion of the field of view of the image capturing device that result in one or more images that are not usable or must be cropped to remove the obstructing object. The obstructed or cropped images may leave gaps in the images and/or may provide panoramic images that do not show a full panoramic view of the environment surrounding the image capturing device(s). In another example, the conventional aerial vehicle image capturing systems may be relatively heavy and awkwardly shaped, which may limit a size of the UAV, a maneuverability of the UAV, a functionality of the UAV, and so forth.

Implementations of the disclosure address the above-mentioned deficiencies and other deficiencies by providing a method, system, device, or apparatus to mount an image capturing device(s) to an aerial vehicle and capture images. The aerial vehicle image capturing system may provide a mounting structure to attach one or more image capturing devices. The aerial vehicle image capturing system may be configured so that the blades, the propellers, and/or the booms of UAVs may not obstruct images captured by the image capturing device. One advantage of the aerial vehicle image capturing system may be to capture high quality images. Another advantage of the aerial vehicle image capturing system may be to provide a versatile structure to attach one or multiple image capturing devices, sensors, accessories, and so forth. Another advantage of the aerial vehicle image capturing system may be to increase the stability of the image capturing device(s) secured to the aerial vehicle.

FIG. 1A illustrates an aerial vehicle image capturing system 100, according to an embodiment. The aerial vehicle image capturing system 100 may include a UAV subsystem 102, a mounting structure 104, and an image capturing subsystem 106. In one embodiment, the frame or substructure of the aerial vehicle image capturing system 100 may be a single piece construction where the frame or structure may be cut from a single piece of material. For example, the frame or substructure may be carbon fiber material, plastic material, rubber material, metal material, polyurethane material, and so forth. For example, the pieces and parts of the frame or substructure of the aerial vehicle image capturing system 100 may be cut from a plate of the material, such as a carbon fiber plate. The pieces and parts may then be assembled to form the frame or substructure. The single piece construction may provide a more durable frame or substructure that is relatively uniform and consistent in the material composition. The single piece construction may also tightly fit together because the pieces and parts are created from the same plate of material. Additionally, the single piece construction may reduce cost and increase an ease of manufacturing of the aerial vehicle image capturing system 100. In another embodiment, the aerial vehicle image capturing system 100 may be formed from pieces or parts created from different materials to create a multi-piece construction.

As further discussed below, the mounting structure 104 may be a structure to mount one or more parts of the image capturing subsystem 106 and the UAV subsystem 102 to. For example, the mounting structure 104 may provide a framework or substructure to mount the UAV subsystem 102 to so that the aerial vehicle image capturing system 100 may fly and the image capturing subsystem 106 may provide a subsystem so that the image capturing devices 118 may capture images.

The UAV subsystem 102 may include motors 108, propellers 110, booms 112, a tail boom 154, a battery 114, a communication device 116, and a sensor 117. The propeller 110 may be a revolving shaft with one or more blades. Each propeller 110 may be connected to one or more motors 108. The motors 108 may rotate the propellers 110 to lift the aerial vehicle. The motors 108 may also be connected to a controller that is part of the processing device 122 that controls a speed that the motors 108 rotate the propellers 110. For example, the controller may rotate different propellers 110 at different speeds to control an altitude and/or flight direction of the aerial vehicle.

The booms 112 and the tail boom 154 may be arms that connect to the mounting structure top boom plate 212 and the bottom boom plate 214. The booms 112 and tail boom 154 may connect the motors 108 to the mounting structure 104 so that the propellers 110 may lift the image capturing subsystem 106 for capturing images. As discussed, below, the booms 112 and tail boom 154 may be rigid material that is shaped to be flexible. For example, the rigid material of the booms 112 and the tail boom 154 may be a rigid material that includes fiber material, such as carbon fibers. The fibers of the rigid material may be cut to shorten the fibers and introduce a weakness in the fibers such that flexibility may occur without causing damage to the material when the material is flexed. In one embodiment, when the aerial vehicle image capturing system 100 hits the ground with a relatively hard impact, such as a crash or a hard landing, the booms 112 and tail boom 154 may flex to decrease the damage to the UAV subsystem 102, the mounting structure 104, and/or the image capturing subsystem 106. For example, when the aerial vehicle image capturing system 100 crashes into the ground, the booms 112 and tail boom 154 may flex upon impact to absorb at least a portion of the impact and then may revert or snap back into their original form after the impact. In another embodiment, the flexible material of the booms 112 and tail boom 154 may twist or bend in multiple directions and remain inflexible in an upward or thrust direction of the aerial vehicle image capturing system 100. The flexibility of the booms 112 and tail boom 154 that absorb the impact may disperse the force of the impact into the flexing of the booms rather than the other pieces or parts of the aerial vehicle image capturing system 100.

In one embodiment, the booms 112 and tail boom 154 may be extend from the side(s) of the mounting structure 104 at a zero degree angle or along a plane 124 perpendicular to the side(s) of the mounting structure 104. In another embodiment, the booms 112 and tail boom 154 may be extend from the side(s) of the mounting structure 104 at a defined angle relative to a plane 124 perpendicular to the side(s) of the mounting structure 104. For example, the booms 112 and tail boom 154 may extend at an upward angle from the plane 124. The angle of the booms 112 and tail boom 154 may define a point of lift for the aerial vehicle image capturing system 100 because the angle of the booms 112 and tail boom 154 may cause the propellers 110 to rotate at substantially the same angle as the booms 112 and tail boom 154. In one example, the angle may be an upward angle of 10 degrees relative to the plane 124. In another example, the angle may be an upward angle of 20 degree relative to the plane 124. The defined angle of the booms 112 and tail boom 154 may increase a stability of the aerial vehicle image capturing system 100 during flight. For example, when all the booms 112 and tail boom 154 are tilted at the defined angle, the booms 112 and tail boom 154 may be pulled together by the propellers 110 toward the same point in space above the aerial vehicle image capturing system 100.

As the booms 112 and tail boom 154 are pulled towards the same point in space, the booms 112 and tail boom 154 may form a dihedral structure when there are two motor 108 and two propellers 110, a trihedral structure when there are three motor 108 and three propellers 110, a quadrahedral structure when there are four motor 108 and four propellers 110, and so forth. The pulling of the booms 112 and tail boom 154 toward the same point may cause the motors 108 and the propellers 110 to slightly oppose each other and resist lateral forces on the aerial vehicle image capturing system 100, such as wind.

The image capturing subsystem 106 may include one or more image capturing devices 118, one or more mounts 120, and a processing device 122. In one embodiment, the image capturing subsystem 106 may include six image capturing devices 118 that may be attached to the mounting structure 104 and capture images in different directions and/or at different angles. For example, the six image capturing devices 118 may be configured to capture images in different directions and/or at different angles and send the images to one or more processing devices 122. In one example, each of the image capturing devices 118 may include individual processing units to analyze, arrange, stream, and/or manipulate images captured by each of the image capturing devices 118, respectively. In another example, the image capturing devices 118 may be connected to a processing device 122. One advantage of a processing device 122 may be to reduce a weight and a complexity of the aerial vehicle image capturing system 100. For example, a processing device 122 may consolidate several memory storage devices and processors of independent processing devices into a single memory storage device and single processor. The processing device 122 may also control camera triggering and image synchronization of the image capturing devices 118.

The processing device 122 may combine the images to generate an aggregate image. In one example, the aggregate image may be a still image, such as a standard format image, a panoramic image, a 360 degree image, an interactive image, a wide angle image, and so forth. In another example, the aggregate image may be a video, such as a standard format video, a panoramic video, a 360 degree video, an interactive video, a wide angle video, and so forth.

In one embodiment, the processing device 122 may receive the images from the image capturing devices 118 and may arrange, export, aggregate, and/or stream the images or an aggregate of the images to an external device or a third party device. For example, the processing device 122 may receive the images from the image capturing devices 118 and stream the images to an external processing device in communication with the processing device 122. The external processing device may arrange, export, aggregate, and/or stream the images to other devices. In another embodiment, the processing device 122 may roughly assemble or generate an initial version of the images into a desired view. For example, when the desired view is a 360 degree image, the processing device 122 may generate an initial version of the images where the images are each assembled in a spherical shape. The initial version may preserve the images that overlap. The processing device 122 may then send the initial version to the external processing device as data raw file readable by the external processing device. The external processing device may then execute an aggregating or stitching program to generate a final version of the 360 degree image.

In one embodiment, the processing device 122 may use the communication device 116 to stream the images, the raw data, and/or the initial version to the external processing device using a wireless communication channel. In another embodiment, the processing device 122 may use the communication device 116 to send the images, the raw data, and/or the initial version to the external processing device using a cable or other physical connection. In another embodiment, the processing device 122 may save the images, the raw data, and/or the initial version to a memory device, such as a memory card, and a user may use the memory device to transfer the images, the raw data, and/or the initial version to the external processing device. In one example, the images, the raw data, and/or the initial version may be live streamed to an external device, such as a display or a head-mounted device for a user to view and/or interact with in real-time. In another example, the images, the raw data, and/or the initial version may be transferred to an external device at a point in time separate from the operation of the aerial vehicle for a user to interact with and/or manipulate at a later point in time. In another embodiment, the communication device 116 may include a global positioning system (GPS).

In another embodiment, the image capturing device 118 may be operable to capture images at different resolution levels. In one example, a first image capturing device 118 may capture a first image at a first resolution level and a second image capturing device 118 may capture a second image at a second resolution level that is different than the first resolution level. In another example, the image capturing devices 118 may be configurable to capture images at different resolution levels. For example, in an outdoor environment the image capturing devices 118 may capture images at a first resolution level and in an indoor environment the image capturing devices 118 may capture images at a second resolution level. The resolution levels of the image capturing devices 118 may be 500×480, 720×480, 720×576, 720×576, 1280×720, 1440×1080, 1920×1080, 1998×1080, 2048×1080, 3840×2160, 4096×2160, 7680×4320, 15360×8640, 61440×34560, and so forth. In another embodiment, the image capturing device 118 may be configured with different aspect ratios and/or fields of view (FOV). In one example, the aspects ratios may be 4:3, 16:9, 18:9, 21:9, 36:10, and so forth. In another example, the FOV may range vertically and/or horizontally between 0 degrees and 360 degrees. In another example, the image capturing devices may have a range of spherical view between $1^2$ and $360^2$. In another example, the FOV may be approximately 170 degrees diagonal, 135 degrees horizontal, and 95 degrees vertical to avoid an overlap between multiple image capturing devices 118. An overlap between images of the multiple image capturing devices 118 may cause a loss of pixels in the images.

The mounts 120 may connect the image capturing devices 118 to the mounting structure 104. For example, each image capturing device 118 may be connected to the mounting structure 104 by a corresponding mount 120. In one embodiment, the mounts 120 may be adjustable to adjust an angle that the image capturing device 118 captures an image relative to the mounting structure 104 and/or other image capturing devices 118. For example, the mounts 120 may each include mounting plates, such as one or more horizontal plates mounted on the top and bottom of the mounting structure 104. When there are six image capturing devices 118, the image capturing devices 118 may be mounted to the mounting structure 104 with the mounts 120 to form an array. The image capturing device array may include three image capturing devices 118 mounted to a top surface of the mounting structure 104 and three image capturing devices 118 mounted to a bottom surface of the mounting structure 104. In one embodiment, the image capturing subsystem 106 may include a seventh image capturing device 118. The seventh image capturing device 118 may be mounted to a top of the mounting structure 104 or a bottom of the mounting structure 104. For example, the seventh image capturing device 118 may be mounted on the bottom of the mounting structure to capture a gap in a panoramic image that may not be captured because of a limited FOV of the other three image capturing device 118 mounted to the bottom surface of the mounting structure 104. In one example, the three image capturing device 118 may be mounted to capture an image at a 10 degree from the horizontal plane 124 or facing 80 degrees away from nadir and the seventh image capturing device 118 may be facing straight down or perpendicular to the horizontal plane 124

In another embodiment, the seventh image capturing device 118 in place of the processing device 122. For example, the seventh image capturing device 118 may be mounted at the bottom of the mounting structure 104 where the processing device 122 is shown in FIG. 1A and the processing device 122 may be removed from the aerial vehicle image capturing system 100 or be mounted at a different location on the mounting structure 104.

The three image capturing devices 118 on the top surface of the mounting structure 104 may be mounted to face 120 degrees away from each other and 45 degrees away from the top surface of the mounting structure 104. The 45 degree angle of the image capturing devices 118 may place a center of the field of view equally spaced between a zenith and a horizon of the top surface of the mounting structure 104.

The three image capturing devices 118 on the bottom surface of the mounting structure 104 may be arranged similar to the image capturing device 118 on the top surface, but rotated 180 degrees about a horizontal axis and 180 degrees about a vertical axis. For example, the three image capturing devices 118 on the bottom surface of the mounting structure 104 may be mounted to face 120 degrees away from each other and 45 degrees away from the bottom surface of the mounting structure 104. The 45 degree angle of the image capturing devices 118 may place a center of the field of view equally spaced between a nadir and a horizon of the bottom surface of the mounting structure 104.

The three image capturing devices 118 on the bottom surface may be offset from three image capturing devices 118 on the top surface by 60 degrees along a plane that is parallel and horizontal to a plane of the top surface. For example, the three image capturing devices 118 on the top surface may be spaced along a circumference of a circular plane at 0 degrees, 120 degrees, and 240 degrees and the three image capturing devices 118 on the bottom surface may be spaced in along a circumference of a parallel circular plane at 60 degrees, 180 degrees, and 300 degrees. The image capturing devices 118 on the top and bottom surfaces may be offset so that they do not interfere with the booms 112 and tail boom 154.

The FOV and the configuration of the image capturing devices 118 and the mounting structure 104 may provide an octahedral array for capturing 360 degree images. In one example, each image capturing device 118 in the octahedral array may be angled 60 degrees away from each other and face outward from a center of the octahedral shape. Additionally, image capturing devices 118 mounted to the bottom surface of the mounting structure 104 may be mounted 180 degrees along an X-axis and a Y-axis from the image capturing devices 118 on the top surface of the mounting structure 104.

In one embodiment, the booms 112 and tail boom 154 may extend from the plane 124 at a defined angle such that the tips of the propellers 110 attached to the booms 112 and tail boom 154 via the motors 108 may be outside the field of view of the image capturing devices 118. For example, the booms 112 and tail boom 154 may line up with the image capturing devices 118 on the top surface of the mounting structure 104 such that when the tips of the propellers 110 are at the propellers' 110 furthest point from the aerial vehicle image capturing system 100, the tips lines up with at an outer boundary of the FOV 126 of the image capturing device 118. In this example, the image capturing device 118 may be pointed up and away from the horizon at 45 degrees while the boom 112 may be angled up at 10 degrees.

The FOV 126 of the image capturing devices 118 may be curved to capture a panoramic view of the environment surrounding the image capturing devices 118 and the tips of the propellers 110 may spin underneath or behind the curved FOV such that the tips do not interfere with the FOV of the image capturing devices 118. The tips of the propellers 110 not interfering with the FOV 126 of the image capturing devices 118 may allow each of the image capturing devices 118 to capture different images that may be aggregated into a panoramic image without the images substantially overlapping. In one example, the different images may not overlap and each image may be unique from each other and provide unique image data. In another example, an edge of one or more of the images may overlap so that the processing device 122 or an external processing device may be able to recognize a location or sequence of each image relative to the other images for a panoramic image.

Figure 1B:
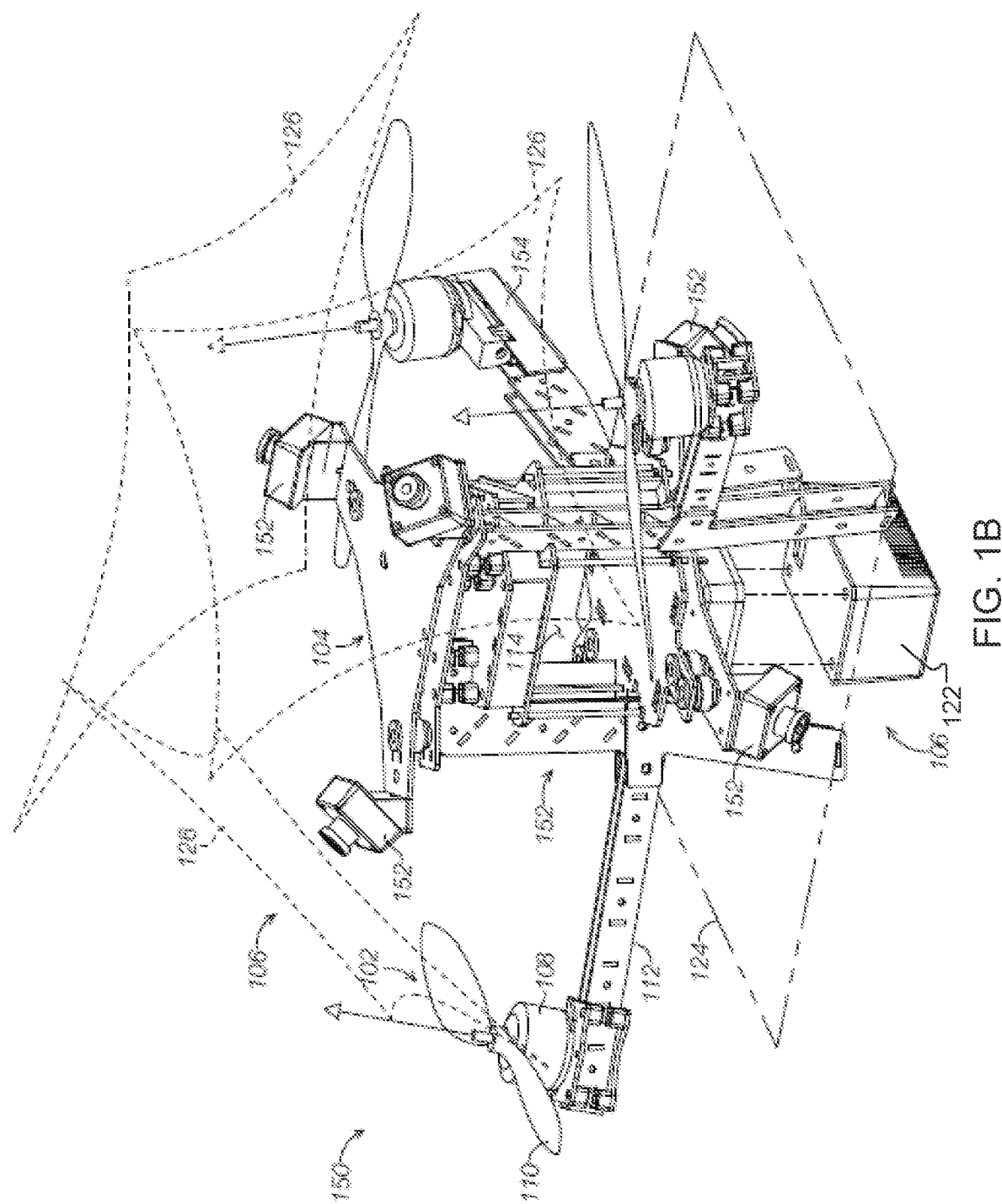
FIG. 1B illustrates aerial vehicle image capturing system, according to an embodiment.

FIG. 1B illustrates aerial vehicle image capturing system 150, according to an embodiment. Some of the features in FIG. 1B are the same or similar to some of the features in FIG. 1A as noted by same reference numbers, unless expressly described otherwise. As discussed above, the aerial vehicle image capturing system 150 may include an image capturing subsystem 106. In one embodiment, the image capturing subsystem 106 may include one or more image capturing devices 152 and a processing device 122.

In one example, an image capturing device 152 may be attached to the mounting structure 104. For example, the image capturing device 152 may be attached to the mounting structure 104 by a fastener, such as a bolt, epoxy, a hook, a loop, a clasp, a cable tie, and so forth. In another example, the image capturing device 152 may be shaped to capture images at a fixed angle when attached to the mounting structure 104. As discussed above, the image capturing devices 152 on the top surface of the mounting structure 104 may be mounted to face 120 degrees away from each other and 45 degrees away from the top surface or the bottom surface of the mounting structure 104. The 45 degree angle of the image capturing devices 118 on the top surface may place a center of the FOV equally spaced between a zenith and a horizon of the top surface of the mounting structure 104. The 45 degree angle of the image capturing devices 118 on the bottom surface may place a center of the field of view equally spaced between a nadir and a horizon of the bottom surface of the mounting structure 104.

The angles that the image capturing devices 152 may be fixed at may not be adjusted so that the image capturing devices 152 may not become loose and lose the desired angles while capturing images during the flight of the aerial vehicle image capturing system 150. For example, an image capturing device mounted to an adjustable mount may vibrate or move as the aerial vehicle image capturing system 150 is in flight, whereas the fixed angle image capturing devices 152 may maintain the fixed angles throughout the flight regardless of vibrations or other forces on the image capturing devices 152.

In another example, the fixed angle image capturing devices 152 may be fixed at approximately 45 degrees to provide an overlap of FOVs between the fixed angle image capturing devices 152. As discussed above, the processing device 122 may receive images captured by the image capturing devices 152 to manipulate the images. For example, the processing device 122 may aggregate images to generate a panoramic image, a 360 degree image, an interactive image, a wide angle image, and so forth. In another example, the processing device 122 may aggregate images to generate a panoramic video, a 360 degree video, an interactive video, a wide angle video, and so forth. The processing device 122 may receive the images from the image capturing devices 152 and may arrange, export, aggregate, and/or stream the images or an aggregate of the images to an external device or third party device.

In another embodiment, the image capturing devices 152 may be operable to capture images at different resolution levels. In one example, a first image capturing device 152 may capture a first image at a first resolution level and a second image capturing device 152 may capture a second image at a second resolution level that is different than the first resolution level. In another example, the image capturing devices 152 may be configurable to capture images at different resolution levels. For example, in an outdoor environment the image capturing devices 152 may capture images at a first resolution level and in an indoor environment the image capturing devices 152 may capture images at a second resolution level. The resolution levels of the image capturing devices 152 may be 500×480, 720×480, 720×576, 720×576, 1280×720, 1440×1080, 1920×1080, 1998×1080, 2048×1080, 3840×2160, 4096×2160, 7680×4320, 15360×8640, 61440×34560, and so forth. In another embodiment, the image capturing device 152 may be configured with different aspect ratios and/or fields of view (FOV). In one example, the aspects ratios may be 4:3, 16:9, 18:9, 21:9, 36:10, and so forth. In another example, the FOV may range vertically and/or horizontally between 0 degrees and 360 degrees. In another example, the image capturing devices may have a range of spherical view between $1^2$ and $360^2$. In another example, the FOV may be approximately 170 degrees diagonal, 135 degrees horizontal, and 95 degrees vertical to avoid an overlap between multiple image capturing devices 152. An overlap between images of the multiple image capturing devices 152 may cause a loss of pixels in the images.

In one embodiment, the processing device 122 may be interchangeable with others systems and configured to switch between different processing modes for different applications. In one example, the processing device 122 may include a docking interface. The docking interface may include one or more ports that may couple with the aerial vehicle image capturing system 150. For example, the docking interface may include ports to connect to the image capturing devices 152 and a controller of the UAV subsystem 102. The processing device 122 may use the docking interface to send and/or receive information with the image capturing devices 152 and/or the controller. The processing device 122 may be removably coupled to the mounting structure 104. The processing device 122 may be removed from the aerial vehicle image capturing system 150 and may be coupled to another system.

In one embodiment, the image capturing subsystem 106 may include the sensor 117 to make other measurements, such as global position system (GPS) measurements, heat measurements, motion measurements, distance measurements, depth measurements, and so forth. In another embodiment, the sensor 117 may be an optical sensor or a camera to capture additional images. In another embodiment, the processing device 122 may be configured to process images and/or sensor data from devices coupled to drone cameras, terrestrial cameras, traffic sensors, desktop computers, and so forth. The processing device 122 may be coupled to the drone cameras, terrestrial cameras, traffic sensors, desktop computers, and so forth via docking interfaces. Based on the type of system the processing device 122 is coupled to, the processing device 122 may perform different functions or execute different programs. In another embodiment, the processing device 122 may be a computer that may be connected to interface devices (such as a mouse, trackpad, or keyboard) and run or execute an operating system.

In one example, to determine the functions to perform and/or the programs to execute, the processing device 122 and/or the docking interface may include switches for a user to select which functions to perform and/or the programs to execute. In one embodiment, the processing device 122 may include multiple onboard memory devices that store executable instructions or programs and the switches may select which of the executable instructions or programs to execute. In another example, when the processing device 122 is coupled to a system via the docking interface, the system may send information indicating which executable instructions or programs to execute.

In one example, the processing device 122 may be configured to process images from aerial image processing devices or terrestrial image processing devices. When the processing device 122 is configured to process images from aerial image processing devices, the processing device 122 may synchronized and analyze images from multiple image capturing devices. In one example, the processing device may analyze the images for object recognition or obstacle avoidance, for programs where the aerial vehicle recognizes and follows the movements of an object, for object identification of a weapon, for threat localization and/or tracking, and so forth. In this example, the processing device 122 may communicate information regarding the object(s) to a controller of the aerial vehicle so that the controller may adjust a flight path of the aerial vehicle.

When the processing device 122 is configured to process images from terrestrial image processing devices, the processing device 122 may be coupled to sensors and may analyze images and sensor data to perform functions such as counting vehicles and/or foot traffic at a location, performing facial recognition at security checkpoints, directing smart vehicles to empty parking spaces, and so forth. When the processing device 122 is configured to be coupled to a computer, the processing device 122 may perform auxiliary functions or other functions offloaded to the processing device 122 by the computer.

Figure 2:
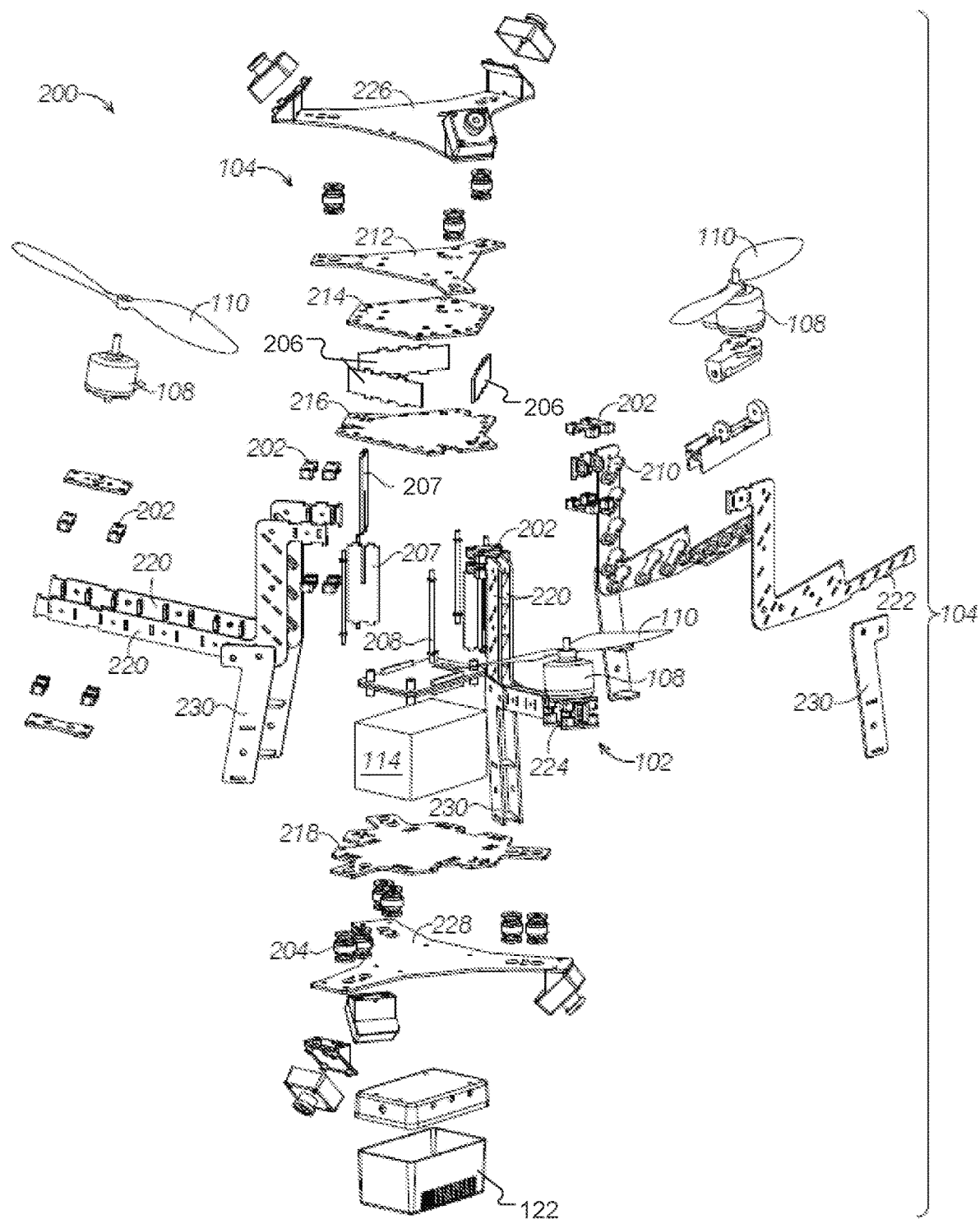
FIG. 2 illustrates an exploded view of an aerial vehicle image capturing system, according to an embodiment.

FIG. 2 illustrates an exploded view of an aerial vehicle image capturing system 200, according to an embodiment. Some of the features in FIG. 2 are the same or similar to some of the features in FIGS. 1A-1B as noted by same reference numbers, unless expressly described otherwise.

The UAV subsystem 102 may include the motors 108, the propellers 110, the booms 112 and tail boom 154, a controller that is integrated into the processing device 122, a battery 114, a top boom plate 212, a bottom boom plate 214, an avionics plate 216, a battery plate 218, a boom 220, a tail boom 154, and a motor mount 224.

The UAV subsystem 102 may include boom blocks 202. A boom block 202 may secure a boom 112 to the UAV subsystem 102 between the top boom plate 212 and the bottom boom plate 214. In one embodiment, the top boom plate 212 may connect the top image capturing device plate 226 to the bottom boom plate 214. In one example, the top boom plate 212 and the bottom boom plate 214 may dampen mild vibrations of the booms 220 to increase a stability of the aerial vehicle image capturing system 200 and increase a quality of image captured by image capturing devices of the aerial vehicle image capturing system 200. In another embodiment, the bottom boom plate 214 may secure the booms 220 to the UAV subsystem 102. In another embodiment, the bottom boom plate 214 may connect to the avionics plate 216.

In one embodiment, the avionics plate 216 may provide a safe or protected area for electronic devices, such as processing devices. In another embodiment, the avionics plate 216 may include slots around the perimeter of the avionics plate to connect to the booms 220 and hold the booms 220 in place.

The UAV subsystem 102 may include an avionics spacer 206. This avionics spacer 206 may provide a specified space between the bottom boom plate and the avionics plate 216 while also resisting or preventing twisting of the UAV subsystem 102 and the mounting structure 104.

The aerial vehicle image capturing system 200 may include a battery spacer 207 and spacer rods 208. The battery spacer 207 and the spacer rods 208 may provide a specified space between the avionics plate 216 and the battery plate 218. Two of battery spacers 207 may be set at 180 degrees height-wise and 90 degrees width-wise of each other. When the two battery spacers 207 are joined together, the battery spacers 207 may form a shape that may resist or prevent twisting of the UAV subsystem 102 and the mounting structure 104. For example, when fastened in place by the spacer rods 208, tabs on the battery spacers 207 may fit into slots on the battery plate 218 and the avionics plate 216. When the battery spacers 207 connect to the battery plate 218 and the avionics plate 216, the battery plate 218 may not move in any direction to resit or prevent twisting of the UAV subsystem 102 and the mounting structure 104. The ends of the spacer rods 208 may be threaded to join the avionics plate 216 to the battery plate 218.

The battery plate 218 may connect to a power source, such as a battery or a power cell. The battery plate 218 may include slots to run wires from the avionics plate 216 to beneath the battery plate 218.

The aerial vehicle image capturing system 200 may include ribs 210. The ribs 210 may vary in size or length, such as short ribs, medium ribs, or long ribs that may connect parts of the UAV subsystem 102 and/or the mounting structure 104 together. In one example, the ribs 210 may be pieces of material or substrates with tabs that fit into the slots of the plates discussed herein to connect parts of the UAV subsystem 102 and/or the mounting structure 104 together. In one example, the ribs 210 may be created from the same material as other parts of the UAV subsystem 102 and/or the mounting structure 104, such as being cut from a carbon fiber plate as discussed herein.

The mounting structure 104 may include a top image capturing device plate 226, a bottom image capturing device plate 228, a vibration damper 204, and landing gear 230. In one embodiment, image capturing devices may be mounted to the top image capturing device plate 226. The top image capturing device plate 226 may include multiple arms (as discussed below), where the opening of each arm may receive a vibration damper 204. In another embodiment, image capturing devices may be mounted to the bottom image capturing device plate 228. The bottom image capturing device plate 228 may include multiple arms (as discussed below), where the opening of each arm may receive a vibration damper 204. In another embodiment, the top image capturing device plate 226 and or the bottom image capturing device plate 228 may include openings for sensors to attach to. For example, the image capturing devices 118 in FIG. 1A and/or the image capturing devices 152 in FIG. 1B may capture images that may be aggregated together to form a panoramic image of an area surrounding the aerial vehicle image capturing system 200. However, the image capturing devices 118 and/or 152 may not provide an accurate ranging of targets.

The sensors attached to the opening of the top image capturing device plate 226 and or the bottom image capturing device plate 228 may include a depth sensor, a light detection and ranging (LIDAR) sensor, a motion sensor, and so forth to make other measurements. For example, the other sensors may include a stereo imaging camera to detect a short-range distance and/or a mid-range distance of objects from the aerial vehicle image capturing system 200 or a LIDAR sensor to detect a mid-range distance and/or a long-range distance of objects from the aerial vehicle image capturing system 200.

The vibration dampers 204 may connect to the image capturing device plates 226 and 228 and isolate the image capturing device plates 226 and 228 from the mounting structure 104 to reduce vibrations. In one example, the vibration dampers 204 may connect the top image capturing device plate 226 to the top boom plate 212 and the bottom image capturing device plate 228 to the bottom boom plate 214.

The booms 220 may include multiple plates, such as two plates, with ribs to connect the top boom plate 212 and/or the bottom boom plate 214. The booms 220 may also include slots cut into each end for attaching the booms 220 to the boom blocks 202. In one embodiment, the booms 220 may be shaped to extend at a defined angle such that the motors 108 and propellers 110 may be angled to lift the aerial vehicle image capturing system 200 at a plane other than a plane of thrust of the aerial vehicle image capturing system 200. For example, if the motors 108 were on the same plane as the plane of lift, the propellers 110 may obstruct the FOV of the image capturing devices 118 in FIGS. 1A and 1B. In another example, the motors 108 and/or the propellers 110 may be on a plane of thrust to lift the aerial vehicle image capturing system 200. The motor mounts 224 may attach the motors 108 to the booms 220. In one example, a top motor mount 224 may be used on the top and bottom on a boom 220 to attach multiple motors 108.

The plane of thrust may be defined as the motors 108 being tilted at a 10 degree angle or in a trihedral pattern and being on the same horizontal level. The plane of thrust may be a plane below the center of gravity of the aerial vehicle image capturing system 200, where the motors 108 lift the aerial vehicle image capturing system 200 while the motors 108 and propellers 110 are out of the FOV of the image capturing device 118 and/or 152. In one example, the booms 220 and the tail boom 222 may include a first portion that extends downwardly and a second portion that extends outwardly to place the motors 108 and propellers 110 below the center of gravity of the aerial vehicle image capturing system 200 while the lift occurs above the center of gravity of the aerial vehicle image capturing system 200. An advantage of the lift being above the center of gravity may be to provide lift for relatively heavy loads while maintaining stability during flight. The configuration of the booms 220 and the tail boom 222 may enable a lever action that transmits force to defined location to act on the frame of the aerial vehicle image capturing system 200 regardless of where the force originates. The tail boom 154 may include tail boom plates, tail plates, and ribs. In one embodiment, the tail boom 154 may include a tilt mechanism to control a yaw of the aerial vehicle image capturing system 200.

The landing gear 230 may attach to the booms 220 to enable the aerial vehicle image capturing system 200 to land and sit on the ground. In one example, the landing gear 230 may be retractable into the aerial vehicle image capturing system 200. In another example, the landing gear 230 may be a fixed structure that does not retract into the aerial vehicle image capturing system 200. The landing gear 230 may include landing gear plates and landing gear ribs that may be secured together by fasteners. The landing gear 230 may form legs that extend downwardly toward the ground to support the aerial vehicle image capturing system 200. In one example, the landing gear 230 may support the aerial vehicle image capturing system 200 while the aerial vehicle image capturing system 200 rests on the ground. In another example, the landing gear 230 may be affixed to a tripod structure.

Figure 3:
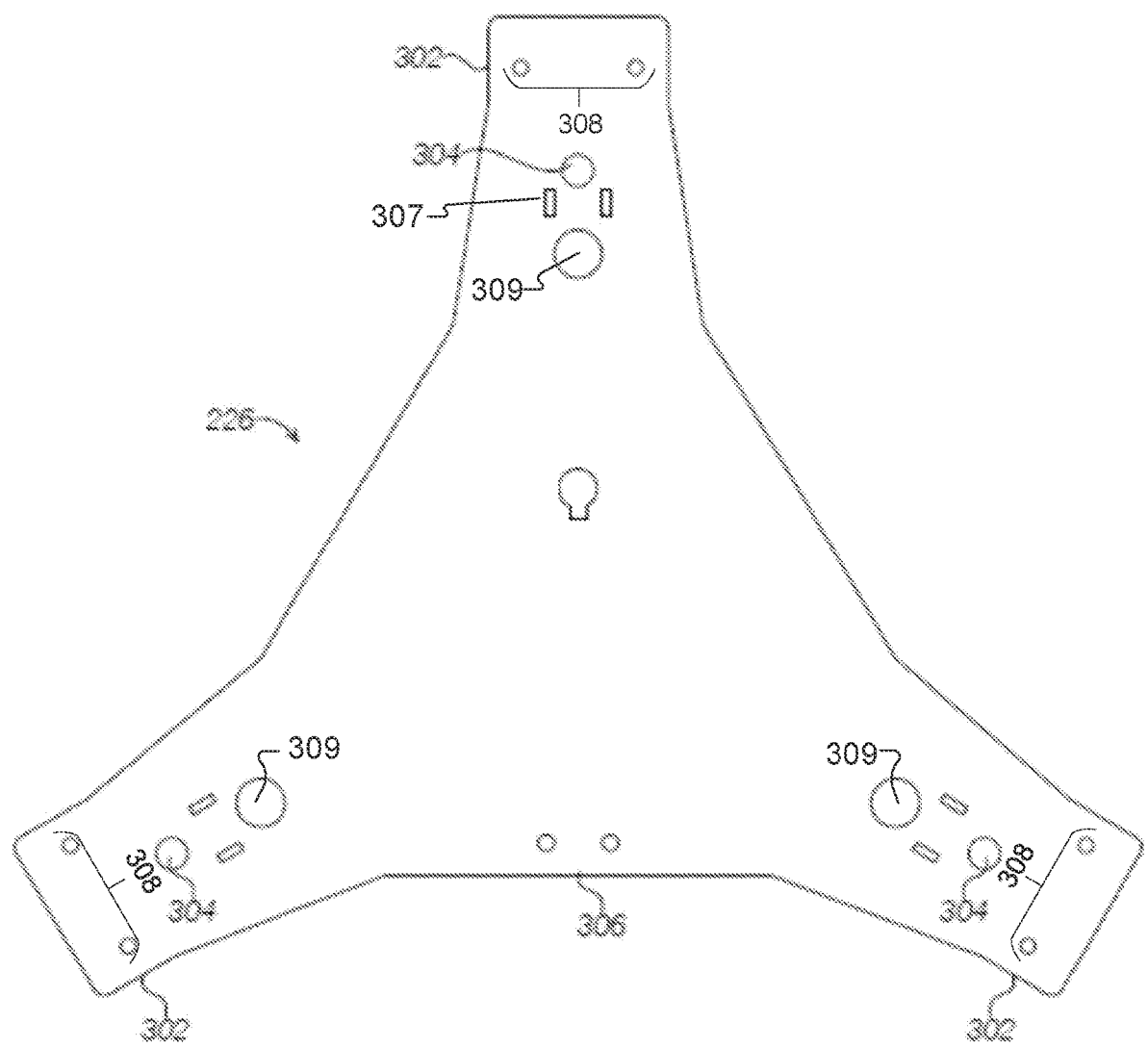
FIG. 3 illustrates the top view of a top image capturing device plate or a bottom image capturing device plate, according to an embodiment.

FIG. 3 illustrates the top view of the top image capturing device plate 226 or the bottom image capturing device plate 228 in FIG. 2, according to an embodiment. Some of the features in FIG. 3 are the same or similar to some of the features in FIG. 2 as noted by same reference numbers, unless expressly described otherwise. The top image capturing device plate 226 and the bottom image capturing device plate 228 may be substantially similar plates that may connect to the image capturing device plates 226 and 228, respectively, via the vibration dampers 204. For simplicity, the top view of the top image capturing device plate 226 or the bottom image capturing device plate 228 in FIG. 3 will be referred to as the top view of the top image capturing device plate 226. However, the features discussed for the top view of the top image capturing device plate 226 may also be included in the bottom image capturing device plate 228.

As discussed above, image capturing devices along a top of the aerial vehicle image capturing system may attach to the top image capturing device plate 226. For example, the top image capturing device plate 226 may include arms 302 that extend from a center of the top image capturing device plate 226. One or more of the arms 302 may include connectors 308 for the image capturing devices to attach to. The connectors 308 may be holes, openings, bolts, fasteners, and so forth that at least a portion of the image capturing devices may connect to.

Figure 4A:
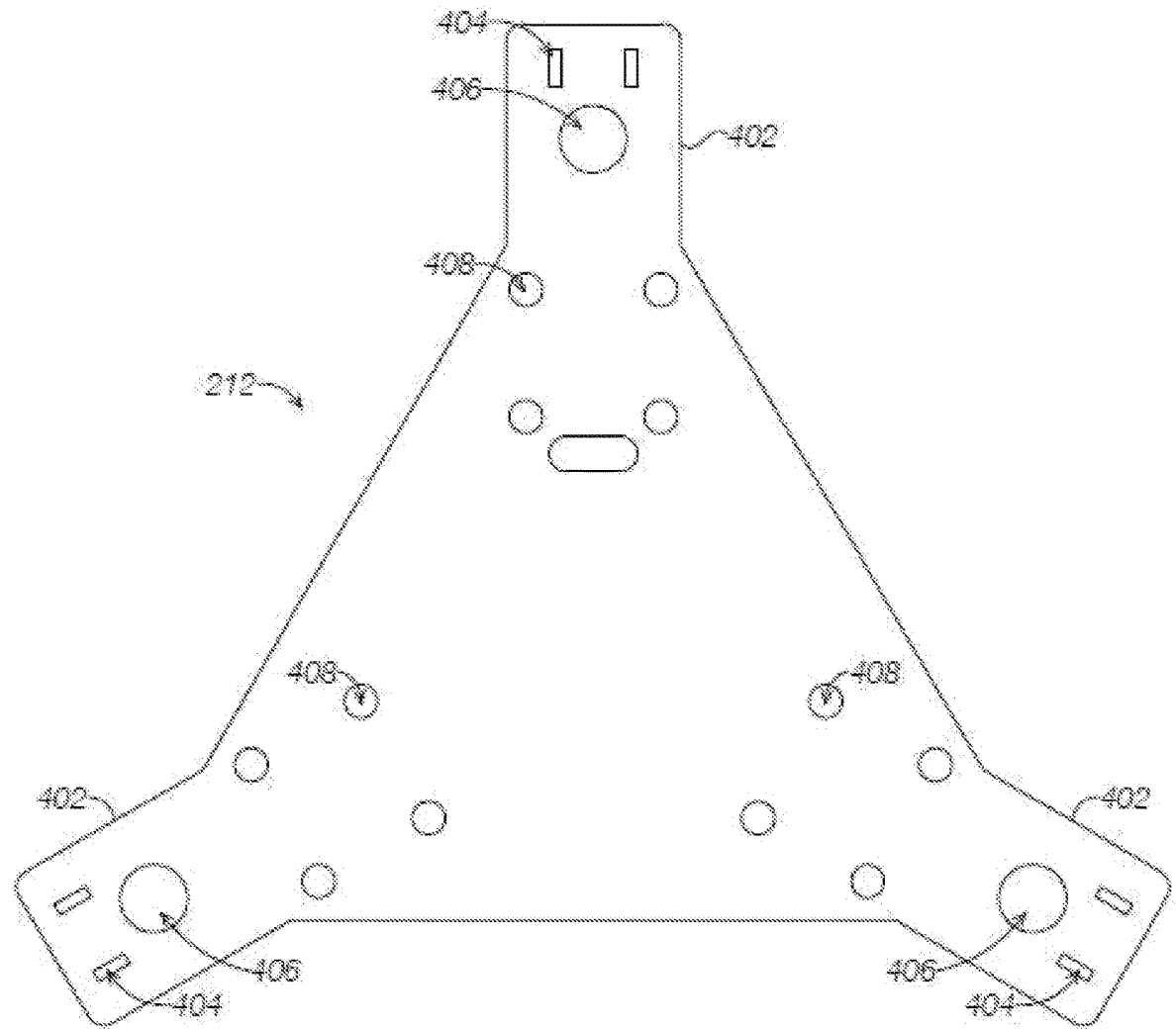
FIG. 4A illustrates a top view of a top boom plate, according to an embodiment.

As discussed above, the arms 302 may also include upper holes 309 for vibration dampers 204 in FIG. 2 to attach to. In one example, the vibration dampers 204 may abut against each upper holes 309 and a fastener (such as a cable tie, a bolt, and so forth) may attach the vibration dampers 204 to the arms 302 via the upper holes 309. In another example, the vibration dampers 204 may extend through the upper holes 309. In this example, the fastener may secure the vibration dampers 204 to the slots 307 via holes 406 as shown in FIG. 4A. The vibration dampers 204 may aid in increasing a stability of the top image capturing device plate 226 in the event of a hard landing or crash landing of the aerial vehicle image capturing system 200.

The top image capturing device plate 226 may also include mounting holes 306 at a bottom middle portion of the top image capturing device plate 226 for another device to attach to the top image capturing device plate 226, such as a first person view (FPV) image capturing device, another image capturing device, a global positioning system (GPS) device, and so forth. The top image capturing device plate 226 may include an upper holes 304 is for running wires or electrical connector of devices (such as image capturing devices) through the top image capturing device plate 226 to attach to other parts of the aerial vehicle image capturing system 200 (such as a processing device or a controller). The top image capturing device plate 226 may include other slots and/or holes for passing wires or cables through and/or for attaching the top image capturing device plate 226 to other components of the aerial vehicle image capturing system 200.

FIG. 4A illustrates a top view of a top boom plate 212 in FIG. 2, according to an embodiment. Some of the features in FIG. 4A are the same or similar to some of the features in FIG. 2 as noted by same reference numbers, unless expressly described otherwise. As discussed above, the top boom plate 212 may connect the top image capturing device plate 226 to the bottom boom plate 214. The top boom plate 212 may include arms 402 extending from a center of the top boom plate 212. One or more of the arms 402 may include holes 406 and tabs 404. In one embodiment, the holes 406 may correspond with arm holes 304 of the top image capturing device plate 226 in FIG. 3. In another embodiment, the tabs 404 may correspond with tabs 307 of the top image capturing device plate 226 in FIG. 3. The holes 402 may be configured to connect the top boom plate 212 to the bottom boom plate 214 by the booms 220 and the boom blocks 202 located between each arm 402. A middle portion of the top boom plate 212 may include holes or slots 408 for running wires or electrical connectors through the top boom plate 212 to attach to other parts of the aerial vehicle image capturing system 200, such as a processing device or a controller. The top boom plate 212 may include other slots and/or holes for passing wires or cables through and/or for attaching the top boom plate 212 to other components of the aerial vehicle image capturing system 200.

Figure 4B:
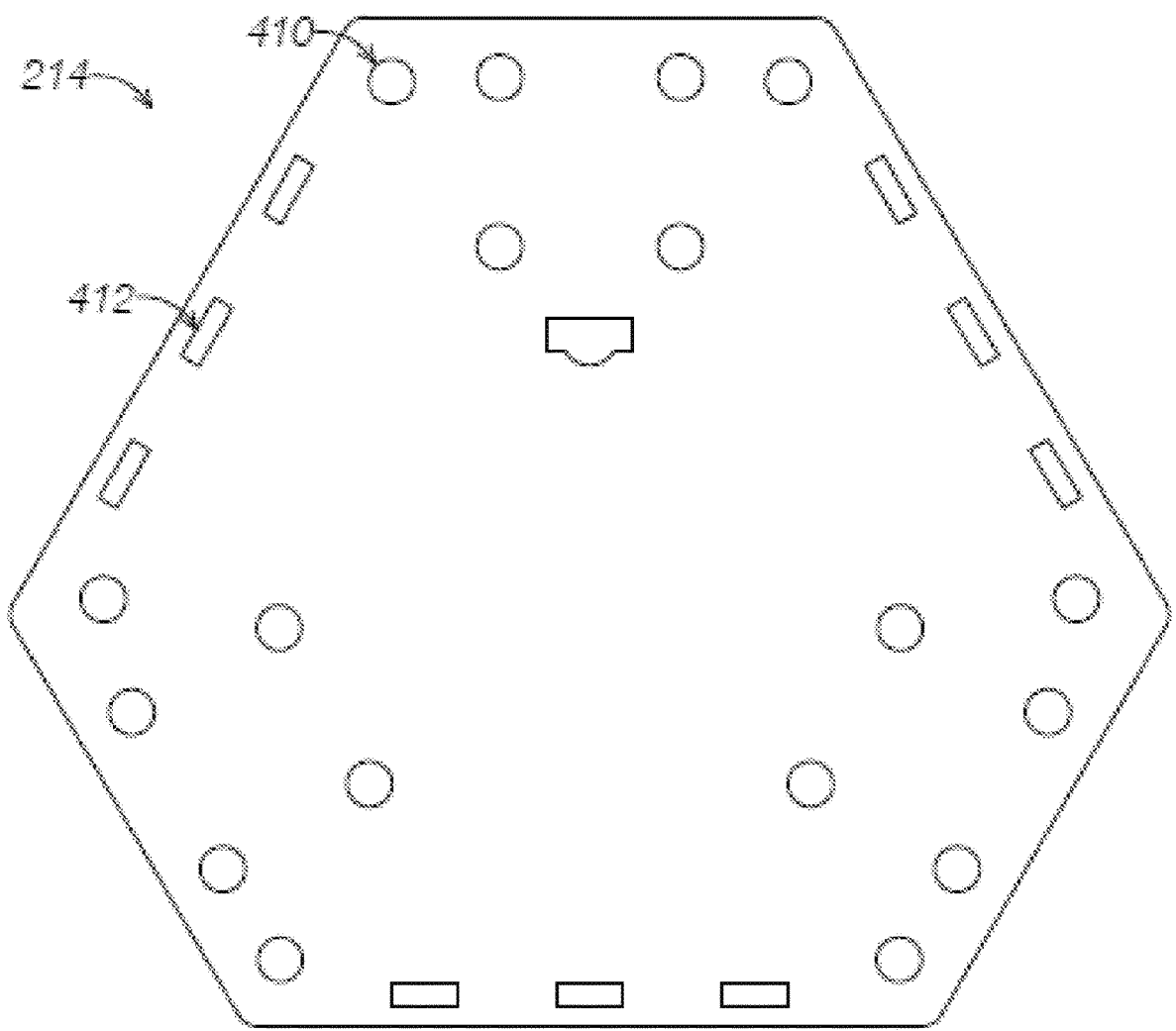
FIG. 4B illustrates a top view of a bottom boom plate, according to an embodiment.

FIG. 4B illustrates a top view of a bottom boom plate 214 in FIG. 2, according to an embodiment. Some of the features in FIG. 4B are the same or similar to some of the features in FIG. 2 as noted by same reference numbers, unless expressly described otherwise. In one embodiment, the bottom boom plate 214 may secure the booms 220 and the tail boom 154 to the mounting structure 104. In one embodiment, the bottom boom plate 214 may connect to the avionics plate 216 via the avionics spacer 206. The bottom boom plate 214 may include holes 410 and slots 412 around a perimeter of the bottom boom plate 214 to connect to the avionics spacer 206. In one example, the booms 220 and the tail boom 154 may be fastened to the bottom boom plate 214. The slots 412 may connect to tabs from the avionics spacer 206. The location and/or shape of the slots 412 may correspond with the slots of the avionics plate 216 so the avionics spacer 206 may be connect to bottom boom plate 214 and the avionics plate 216 once the bottom boom plate 214 and the avionics plate 216 are fastened together by the tabs or may be located by the tabs. The bottom boom plate 214 may include other slots and/or holes for passing wires or cables through and/or for attaching the bottom boom plate 214 to other components of the aerial vehicle image capturing system 200.

Figure 5:
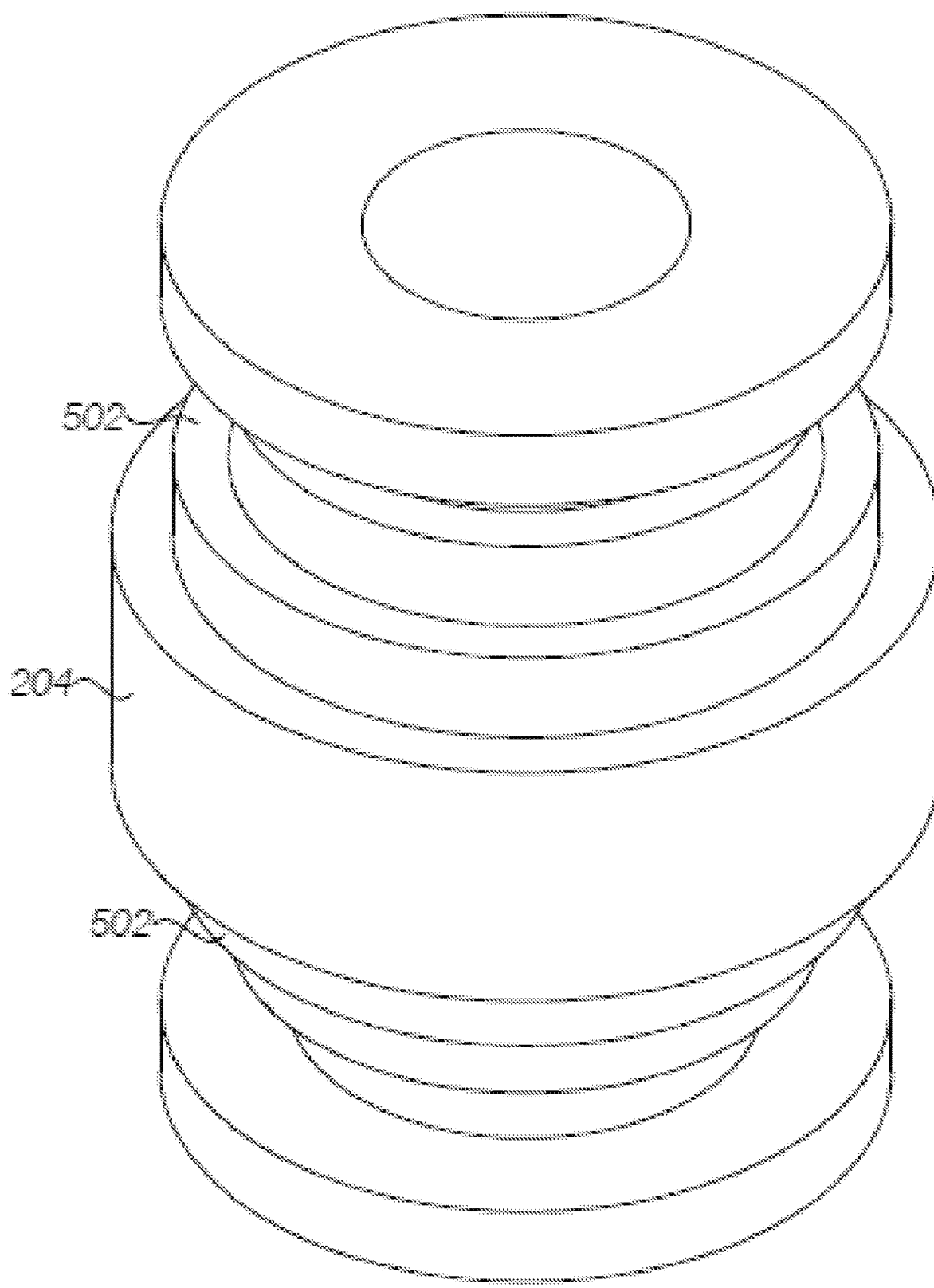
FIG. 5 illustrates a perspective view of a vibration damper, according to an embodiment.

FIG. 5 illustrates a perspective view of the vibration damper 204 in FIG. 2, according to an embodiment. Some of the features in FIG. 5 are the same or similar to some of the features in FIG. 2 as noted by same reference numbers, unless expressly described otherwise. In one embodiment, the vibration damper 204 may be a rubber vibration damping ball, where the vibration damper 204 has a substantially roundish shape. The vibration damper 204 may be shaped to absorb vibrations from part of the mounting structure 104 or other parts of the aerial vehicle image capturing system 200. For example, the vibration damper 204 may include cascading ribs 502 that may compress and expand as vibrating forces are applied to the vibration damper 204. In another example, the vibration damper 204 may be a force absorbing material that may absorb forces from the mounting structure 104 or other parts of the aerial vehicle image capturing system 200. The absorbing material may be rubber material, polyurethane material, and so forth.

In another example, the vibration damper 204 may be configured to connect to the top image capturing device plate 226 and the bottom image capturing device plate 228. The vibration damper 204 may isolate the top image capturing device plate 226 and the bottom image capturing device plate 228 from the other parts of the mounting structure 104 to reduce vibrations from the mounting structure 104 and/or other parts of the aerial vehicle image capturing system 200. In one embodiment, six vibration dampers 204 may connect to the top image capturing device plate 226 and six vibration dampers 204 may bottom image capturing device plate 228 to isolate image capturing devices connected to the top image capturing device plate 226 and the bottom image capturing device plate 228 from vibrating, which vibration would reduce a quality and/or stability of images captures by the image capturing devices. In one embodiment, the vibration dampers 204 may connect to the top image capturing device plate 226 and the bottom image capturing device plate 228 by fasteners, such as cable ties.

Figure 6:
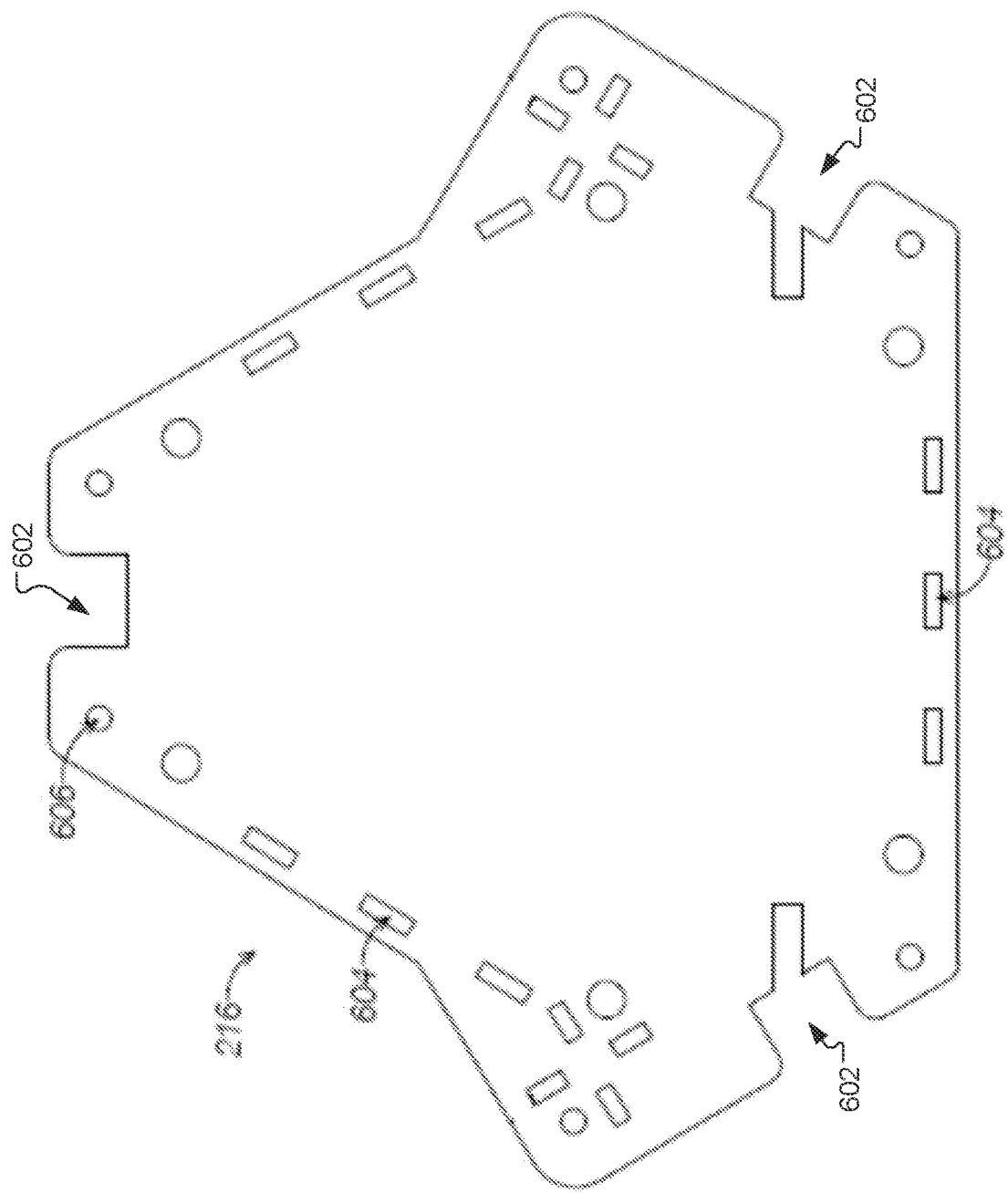
FIG. 6 illustrates a top view of the avionics plate, according to an embodiment.

FIG. 6 illustrates a top view of the avionics plate 216 in FIG. 2, according to an embodiment. Some of the features in FIG. 6 are the same or similar to some of the features in FIG. 2 as noted by same reference numbers, unless expressly described otherwise. The avionics plate 216 may provide an area for electronics of the aerial vehicle image capturing system 200 to connect to. In one embodiment, a flight controller may be mounted to the avionics plate 216. For example, the flight controller may be mounted to the avionics plate 216 by foam pads with adhesive to isolate an inertial management unit (IMU) of the flight controller from vibrations. The avionics plate 216 may include slots 602 around a perimeter of the avionics plate 216 to connect to the booms 220 to hold the booms 220 in place and limit the flexibility of the booms 220 to the horizontal parts radiating out towards the motors 108 in FIGS. 1A and 1B.

The avionics plate 216 may include inner slots 604 at a center portion of the avionics plate 216 to provide a connection point for the avionics plate 216 to connect to the avionics spacers 206 in FIG. 2. The avionics plate 216 may include fasteners holes 606 for the avionics plate 216 to fasten to the bottom boom plate 214. In one embodiment, the slots 604 may be located along a perimeter of the avionics plate 216. In one example, when the booms 220 and/or the tail boom 154 are fastened to the avionics plate 216, the booms 220 and/or the tail boom 154 may securely fit in the slots 604 to provide stability for the booms 220 and/or the tail boom 154. The secure fit of the booms 220 and/or the tail boom 154 in the slots 604 may prevent twisting of the booms 220, the tail boom 154, and/or the avionics plate 216 at and/or above this avionics plate 216. In another example, the booms 220 and/or the tail boom 154 may only be flexible between the motors 108 and the avionics plate 216. The avionics plate 216 may include other slots and/or holes for passing wires or cables through and/or for attaching the avionics plate 216 to other components of the aerial vehicle image capturing system 200.

Figure 7:
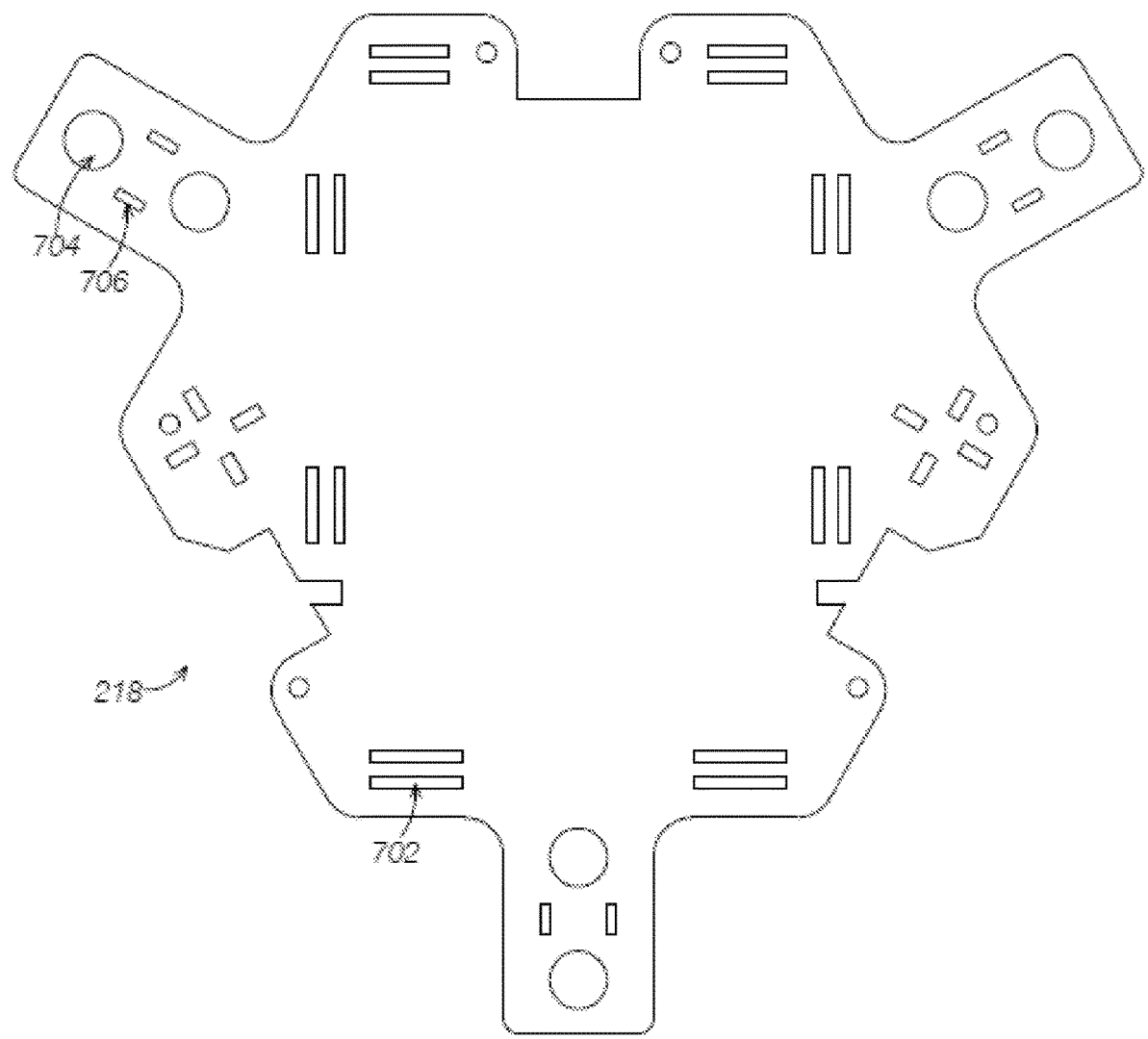
FIG. 7 is a top view of a battery plate, according to an embodiment.

FIG. 7 is a top view of a battery plate 218 in FIG. 2, according to an embodiment. Some of the features in FIG. 7 are the same or similar to some of the features in FIG. 2 as noted by same reference numbers, unless expressly described otherwise. In one embodiment, the battery plate 218 may connect to a power source of the aerial vehicle image capturing system 200. In one example, the power source may include a battery. The power source may be fastened to the battery plate 218 by fasteners (such as strap, ties, and so forth) running through the slots 702 around a perimeter of the battery plate 218. The battery plate 218 may include two slots to run wires from the avionics plate 216 to beneath the battery plate 218. The battery plate 218 may include fastener holes 704 and fastener tabs 706 around the perimeter of the battery plate 218 that correspond and line up with the holes and tabs of the bottom image capturing device plate 228. For example, the vibration dampers 204 and/or other fasteners may connect the battery plate 218 to the bottom image capturing device plate 228 via the corresponding holes and/or tabs. The battery plate 218 may include other slots and/or holes for passing wires or cables through and/or for attaching the battery plate 218 to other components of the aerial vehicle image capturing system 200.

Figure 8:
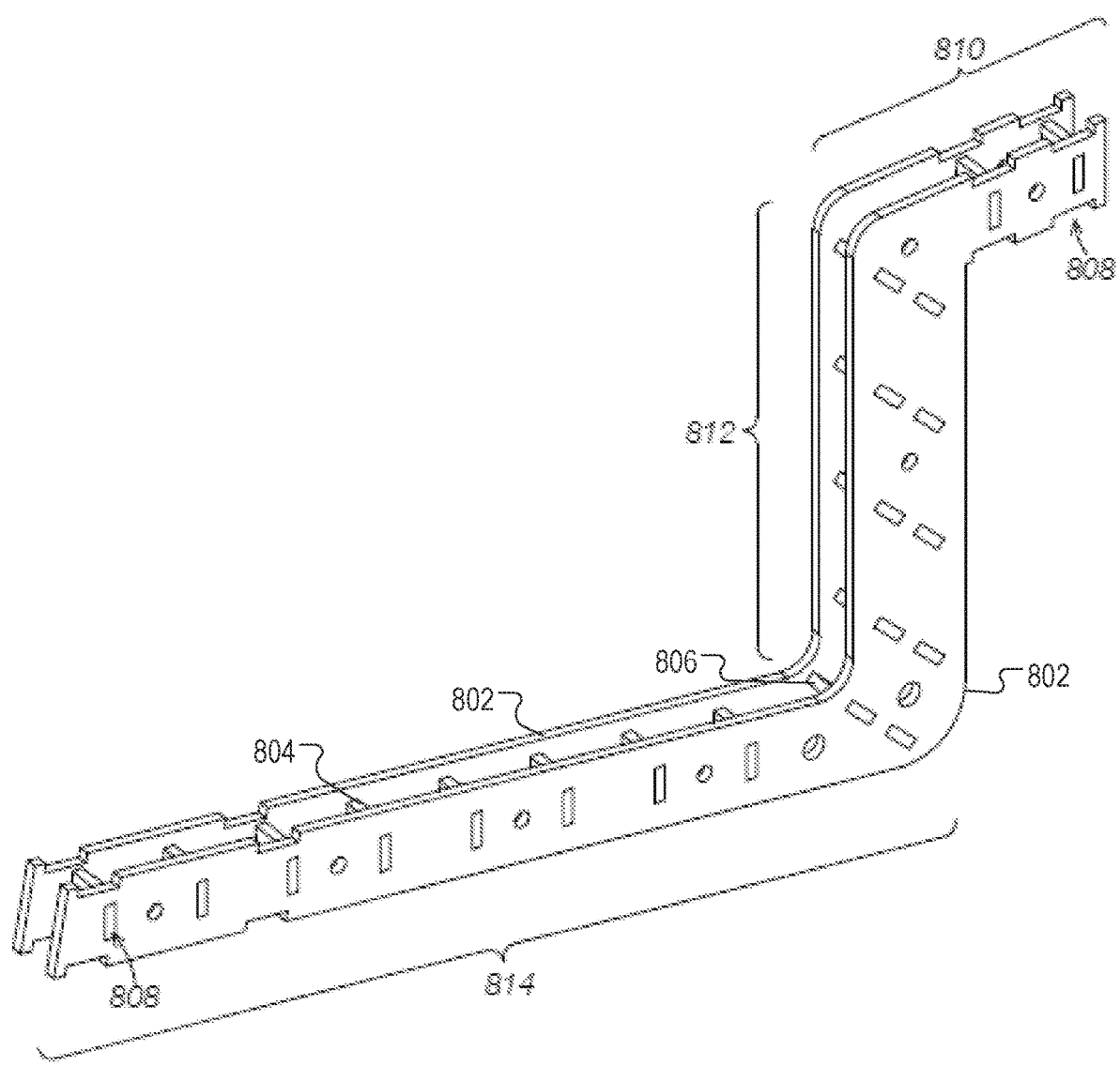
FIG. 8 illustrates a side view of an assembly for a boom, according to an embodiment.

FIG. 8 illustrates a side view of an assembly 802 for the boom 220 in FIG. 2, according to an embodiment. Some of the features in FIG. 8 are the same or similar to some of the features in FIG. 2 as noted by same reference numbers, unless expressly described otherwise. In one embodiment, the boom 220 may include multiple assembly 802 with substantially the same configuration that may be connected together to form the boom 220.

In one example, the assembly 802 may include ribs 804 and ribs 806 to connect the assembly 802. In one embodiment, the assembly 802 may include slots 808 cut into each end of the assembly 802. The ribs 804 and 806 and the slots 808 may connect the assembly 802 together. In one example, the boom blocks 202 may mount the booms 220 to the mounting structure 104. In another embodiment, the boom blocks 202 may attach the motor mounts 224 to a lower end of the booms 220.

In one embodiment, each assembly 802 of the boom 220 may include a first portion 810 that connects to the mounting structure 104 and extends outwardly from the mounting structure 104. The assembly 802 may include a second portion 812 that extends downwardly or perpendicularly from the first portion 810. The assembly 802 may include a third portion 814 that extend upwardly from the second portion 812 at a defined angle relative to the ground. For example the third portion 814 may extend upwardly from the second portion at a degree between 1 degree and 89 degrees from the second portion. The first portion 810, the second portion 812, and the third portion 814 may be configured to provide a point of lift of the propellers 110 in FIGS. 1A-2 to be on a plane that is different than a horizontal plane or a plane of lift at the attachment point of the aerial vehicle image capturing system 100, 150 and/or 200 in FIGS. 1A-2.

The configuration of the assembly 802 that form the booms 220 may provide a point of lift that may not interfere with the FOV of image capturing devices. For example, when the motors 108 and propellers 110 extend along the horizontal plane (relative to the ground) of the aerial vehicle image capturing system 100, 150 and/or 200, the motors 108 and/or the propellers 110 may extend out into a FOV of the image capturing devices in order to provide sufficient lift to lift the aerial vehicle image capturing system 100, 150 and/or 200 into flight. When the motors 108 and propellers 110 extend outward at an angle relative to the horizontal plane of the aerial vehicle image capturing system 100, 150 and/or 200, the motors 108 and/or the propellers 110 may not need to extend out into a FOV of the image capturing devices in order to provide sufficient lift to lift the aerial vehicle image capturing system 100, 150 and/or 200 into flight.

The configuration of the assembly 802 may also protect the power source connected to the battery plate 218 by forming a cage around the power source. The cage may protect the power source in the event of a collision or crash of the aerial vehicle image capturing system 100, 150 and/or 200. The assembly 802 for the boom 220 may include other slots and/or holes for passing wires or cables through and/or for attaching the assembly 802 for the boom 220 to other components of the aerial vehicle image capturing system 200.

Figure 9:
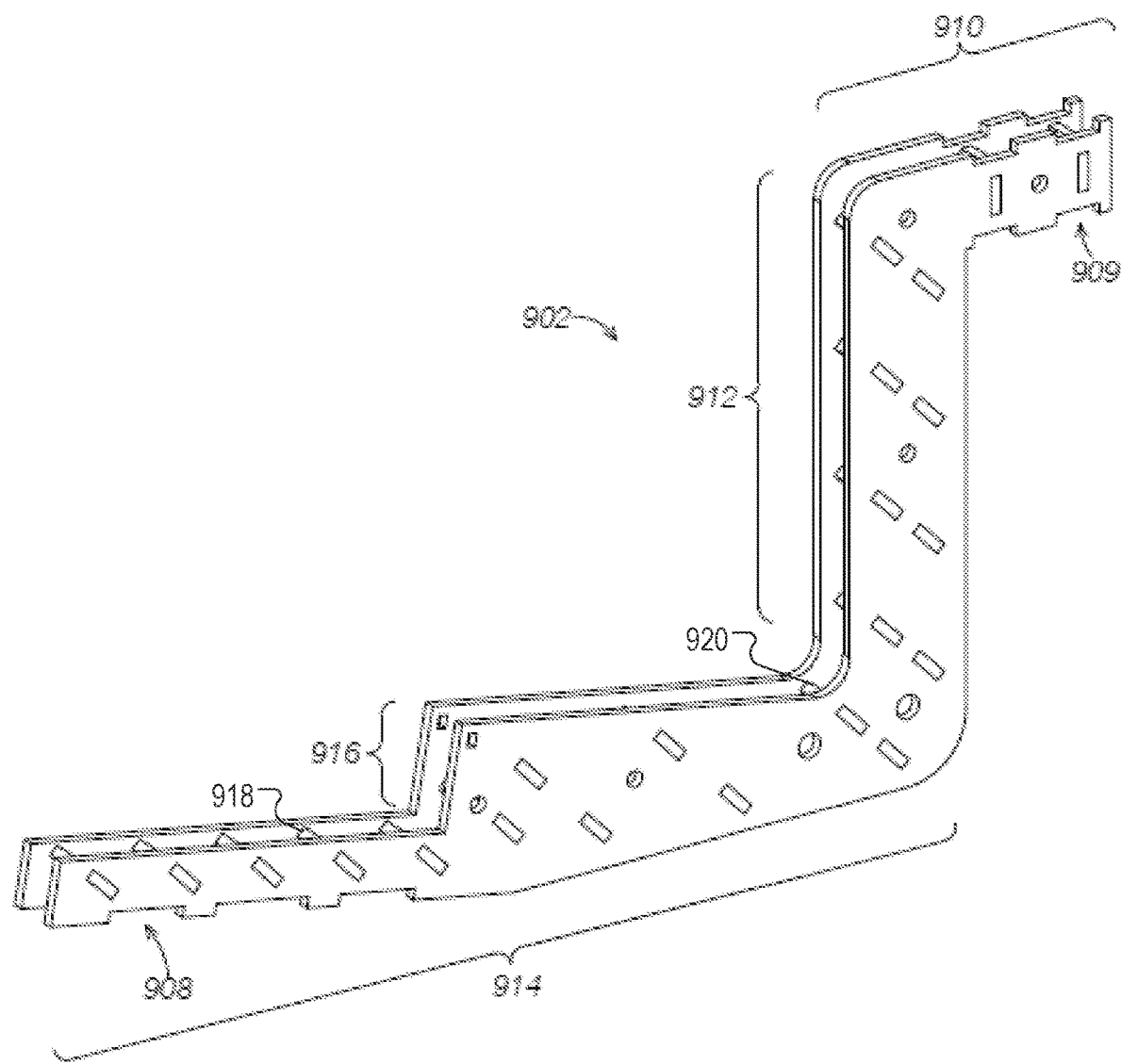
FIG. 9 illustrates a side view of an assembly for a tail boom, according to an embodiment.

FIG. 9 illustrates a side view of an assembly 902 for the tail boom 222 in FIG. 2, according to an embodiment. Some of the features in FIG. 9 are the same or similar to some of the features in FIG. 2 as noted by same reference numbers, unless expressly described otherwise. In one embodiment, the tail boom 222 may include multiple assembly 902 with substantially the same configuration that may be connected together to form the tail boom 154. For example, the tail boom 222 may include two assembly 902 and ribs 918 and 920.

In another example, the assembly 902 may include slots 908 cut into each end of the assembly 902. The slots 908 may be configured to mount to a tail tilt. In one example, the boom blocks 202 may mount the tail boom 154 to the mounting structure 104. In another embodiment, the boom blocks 202 may attach the motor mounts 224 to a lower end of the booms 220.

In one embodiment, each assembly 902 of the tail boom 222 may include first portion 910 that connects to the mounting structure 104 and extends outwardly from the mounting structure 104. The assembly 902 may include a second portion 912 that extends downwardly or perpendicularly from the first portion 910. The assembly 902 may include a third portion 914 that extend upwardly from the second portion 912, relative to the ground, at a defined angle. For example the third portion 914 may extend upwardly from the second portion at a degree between 1 degree and 89 degrees from the second portion. The first portion 910, the second portion 912, and the third portion 914 may be configured to provide a point of lift for the propellers 110 in FIGS. 1A-2 that is different the horizontal plane of the aerial vehicle image capturing system 100, 150 and/or 200 (relative to the ground) in FIGS. 1A-2.

The configuration of the assembly 902 that form the tail boom 222 may provide a point of lift that may not interfere with the FOV of image capturing devices. For example, when the motors 108 and propellers 110 extend along the horizontal plane (relative to the ground) of the aerial vehicle image capturing system 100, 150 and/or 200, the motors 108 and/or the propellers 110 may extend out into a FOV of the image capturing devices in order to provide sufficient lift to lift the aerial vehicle image capturing system 100, 150 and/or 200 into flight. When the motors 108 and propellers 110 extend outward at an angle relative to the horizontal plane of the aerial vehicle image capturing system 100, 150 and/or 200, the motors 108 and/or the propellers 110 may not need to extend out into a FOV of the image capturing devices in order to provide sufficient lift to lift the aerial vehicle image capturing system 100, 150 and/or 200 into flight.

The configuration of the assembly 802 may also protect the power source connected to the battery plate 218 by forming a cage around the power source. The cage may protect the power source in the event of a collision or crash of the aerial vehicle image capturing system 100, 150 and/or 200.

The assembly 902 may also include a mounting portion 916 for mounting a tilt mechanism for the tail motor to provide yaw control for the aerial vehicle image capturing system 100, 150 and/or 200. In one example, the tilt mechanism may be controlled by a servo. The assembly 802 for the boom 220 may include other slots and/or holes for passing wires or cables through and/or for attaching the assembly 802 for the boom 220 to other components of the aerial vehicle image capturing system 200.

Figure 10A:
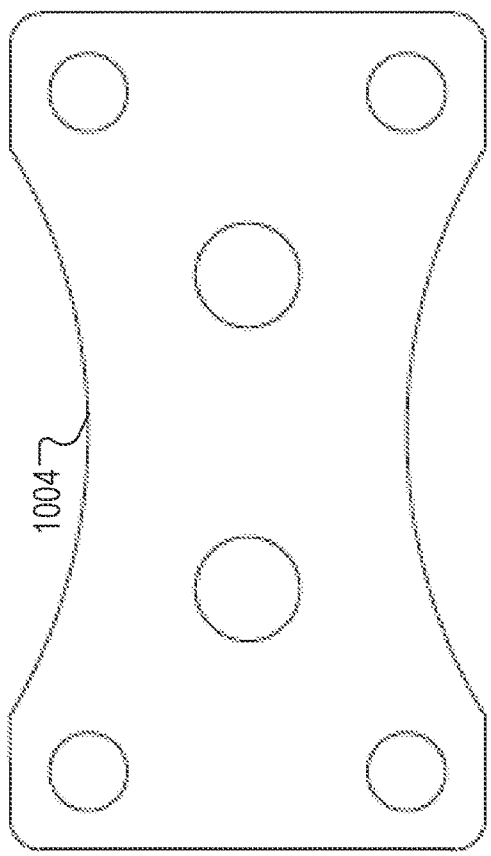
FIG. 10A illustrates a top view of a motor mount top, according to an embodiment.
Figure 10B:
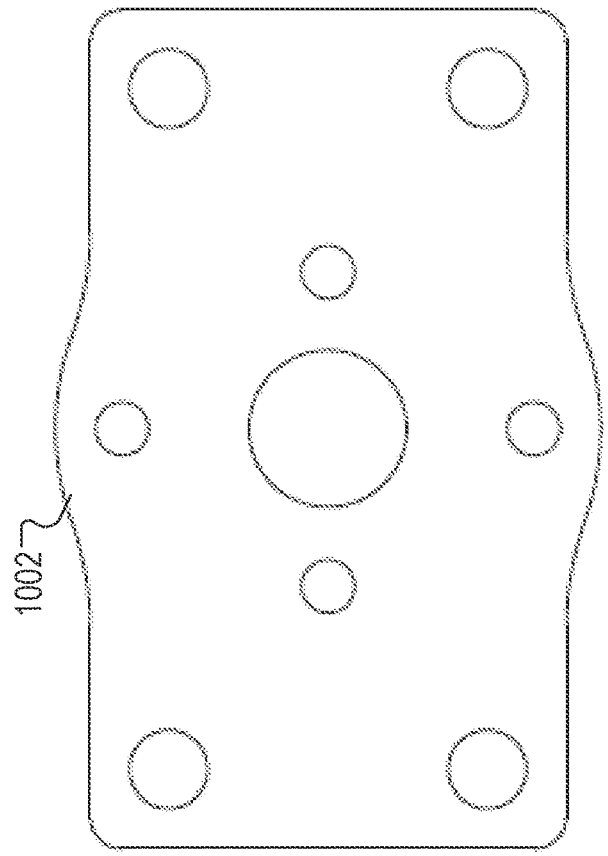
FIG. 10B illustrates a top view of a motor mount bottom, according to an embodiment.

FIG. 10A illustrates a top view of a motor mount top plate 1002 of the motor mount 224 in FIG. 2, according to an embodiment. FIG. 10B illustrates a top view of a motor mount bottom plate 1004 of the motor mount 224 in FIG. 2, according to an embodiment. Some of the features in FIGS. 10A and 10B are the same or similar to some of the features in FIG. 2 as noted by same reference numbers, unless expressly described otherwise. The motor mount 224 and the boom blocks 202 may attach the motor 108 in FIG. 2 to the booms 220. In one example, the motor mount plates 1002 and 1004 may be formed from the same material as other parts of the aerial vehicle image capturing system 200 in FIG. 2, such as being formed form a carbon fiber plate. In one example the motor mount plate 1002 may be connected or fastened to the motor mount plate 1004 by fasteners and allow a motor shaft and c-clips on the motor 108 in FIG. 2 to spin freely.

Figure 11:
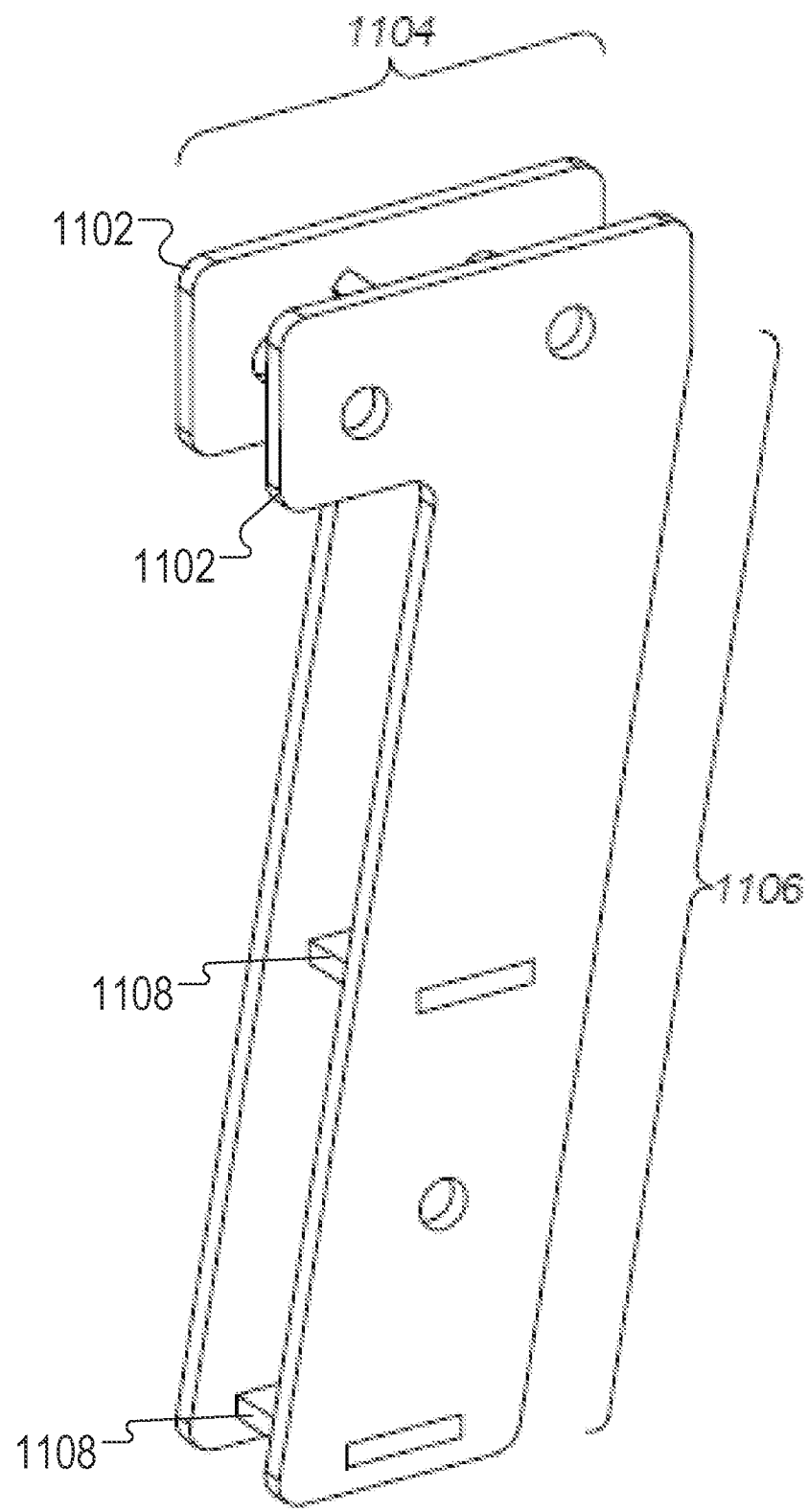
FIG. 11 shows a landing gear assembly for landing gear, according to an embodiment.

FIG. 11 shows landing gear assembly 1102 for the landing gear 230 in FIG. 2, according to an embodiment. Some of the features in FIG. 11 are the same or similar to some of the features in FIG. 2 as noted by same reference numbers, unless expressly described otherwise. The landing gear 230 may include multiple landing gear plates 1102 with substantially the same configuration that may be connected together to each leg of the landing gear 230. For example, the landing gear 230 may include two landing gear plates 1102 and landing gear ribs 1108. Each plate of the landing gear 230 may include a first portion 1104 that connects to the booms 220 and/or the tail boom 222 and a second portion 1106 that extends at an angle from the first portion 1104.

The landing gear plates 1102 may connect to the booms 220 to allow the aerial vehicle image capturing system 200 in FIG. 2 to land and/or sit on the ground. The aerial vehicle image capturing system 200 may include multiple pairs of landing gear plates 1102 that are connected to each of the respective booms 220 and tail booms 222 to form multiple landing gear legs of the landing gear 230 to support the aerial vehicle image capturing system 200 as it sits on the ground or lands from flight.

Figure 12A:
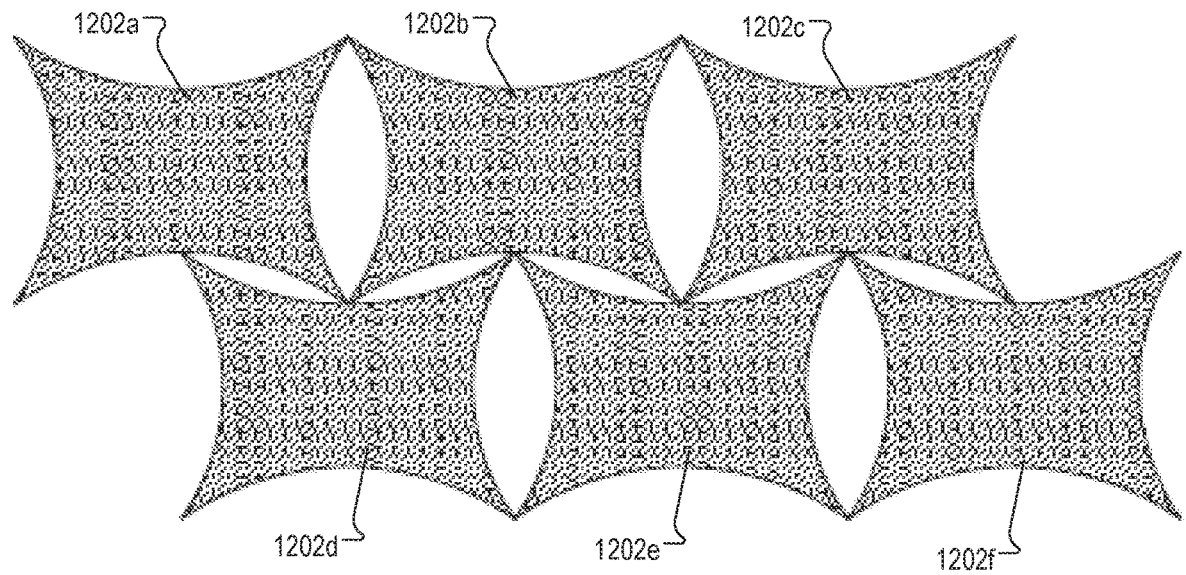
FIG. 12A illustrates multiple images captured by image capturing devices, according to an embodiment.

FIG. 12A illustrates images 1202a-1202f captured by image capturing devices, according to an embodiment. As discussed above, the image capturing devices 118 and/or 152 in FIGS. 1A-B may capture images within the FOVs 126 of each respective image capturing devices 118 and/or 152. The images 1202a-1202f may correspond to images captured by the image capturing devices 118 and/or 152. For example, the first image 1202a may correspond to an image capture by a first image capturing device 118 or 152, the second image 1202b may correspond to an image capture by a second image capturing device 118 or 152, the third image 1202c may correspond to an image capture by a third image capturing device 118 or 152, the fourth image 1202d may correspond to an image capture by a fourth image capturing device 118 or 152, the fifth image 1202e may correspond to an image capture by a fifth image capturing device 118 or 152, and the sixth image 1202f may correspond to an image capture by a sixth image capturing device 118 or 152. As discussed above, the image capturing device 118 or 152 may have FOVs 126 where the tips of propellers 110 lines up with at an outer boundary of the FOV 126 such that the images 1202a-f do not include the tips of the propellers or other obstructing objects from the aerial vehicle image capturing system 100. In one example, the images 1202a-f may be rectangularly shaped with concave edges.

The image capturing devices 118 or 152 may be mounted around a bottom perimeter and a top perimeter of the aerial vehicle image capturing system 100 such that an aggregate of images 1202a-f may capture a panoramic image. In one embodiment, a processing device may aggregate the images 1202a-f to generate the panoramic image by aligning the tips of the images 1202a-f. In one example, the tips of the images 1202a-f may be aligned such that the images 1202a-f do not overlap and each image provides a unique view of the area surrounding the aerial vehicle image capturing system 100.

In one embodiment, one or more of the images 1202a-f may be tagged or include an identifier to indicate an order that the processing device is to aggregate to the images 1202a-f to generate the panoramic image. In another embodiment, the processing device may sort and aggregate the images 1202a-f based on identification information indicated the location of the image capturing devices 118 or 152 on the aerial vehicle image capturing system 100.

Figure 12B:
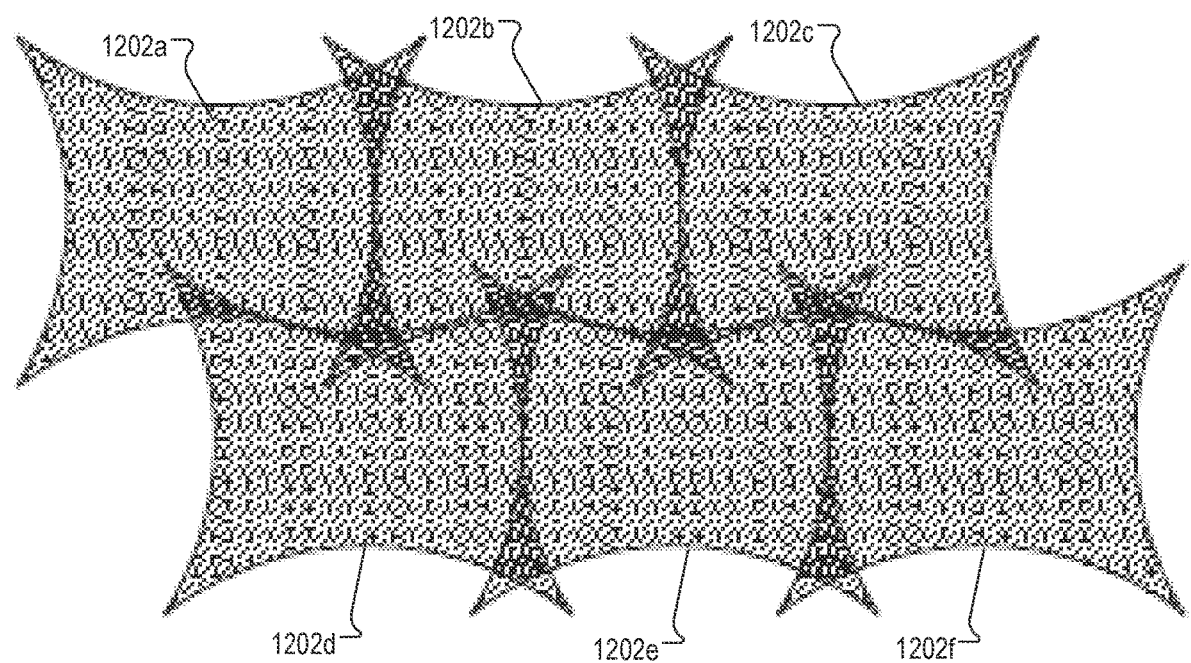
FIG. 12B illustrates multiple images captured by image capturing devices aggregated together into a panoramic image that is an equirectangular projection, according to an embodiment.

FIG. 12B illustrates multiple images captured by image capturing devices aggregated together into a panoramic image that is an equirectangular projection, according to an embodiment. Some of the features in FIG. 12B are the same or similar to some of the features in FIG. 12A as noted by same reference numbers, unless expressly described otherwise. As discussed above, in one embodiment, the tips of the images 1202a-f may be aligned such that the images 1202a-f do not overlap and each image provides a unique view of the area surrounding the aerial vehicle image capturing system 100. In another embodiment, a portion of the images 1202a-f may overlap and provide a portion of the same view of the area surrounding the aerial vehicle image capturing system 100. In another embodiment, the images 1202a-f may be an equirectangular projection.

In one embodiment, a processing device may use the overlapping portions of the images 1202a-f to align and aggregate the images 1202a-f to generate the panoramic image. In one example, the tips of the images 1202a-f may overlap with other corresponding images 1202a-f. For example, the right tips of image 1202a may overlap with the left tips of image 1202b, the right tips of image 1202b may overlap with the left tips of image 1202c, the right tips of image 1202d may overlap with the left tips of image 1202e, and the right tips of image 1202e may overlap with the left tips of image 1202f.

In one embodiment, the overlapping tips may extend from an edge of the tips to a center or middle of a concave edge of the images 1202a-f. In one embodiment, the curves of one of the images 1202a-f may follow an adjacent one of the images 1202a-f to eliminating unnecessary overlap. The unnecessary overlap may be overlap which the processing device does not need to align the images 1202a-f. Removing the unnecessary overlay may avoid reducing a resolution of the images 1202a-f caused by removing overlapping portions of images. In another embodiment, the images 1202a-c may be images captured by image capturing devices 118 or 152 that are facing upward and away from the horizon at approximately a 45 degree angle and the images 1202d-f may be captured by image capturing devices 118 or 152 that are facing downward and away from the horizon at approximately a 45 degrees. The images 1202a-c may be facing away from the images 1202d-f at 90 degrees and 60 degrees askew.

The processing device may use the respective tips of the images 1202a-f to sort, align, and generate the panoramic image. In one embodiment the processing device may stagger the images 1202a-f to generate the panoramic image. In another embodiment, the processing device may lay the images 1202a-f in a flat array. The flat array may resemble a shape of a world map where the ends wrap around to meet the other side. In one embodiment, the images 1202a-f may be combined together in the array so that the images 1202a-f only overlap at a minimal level to so that there are not holes or missing portions in the panoramic image.

Figure 13:
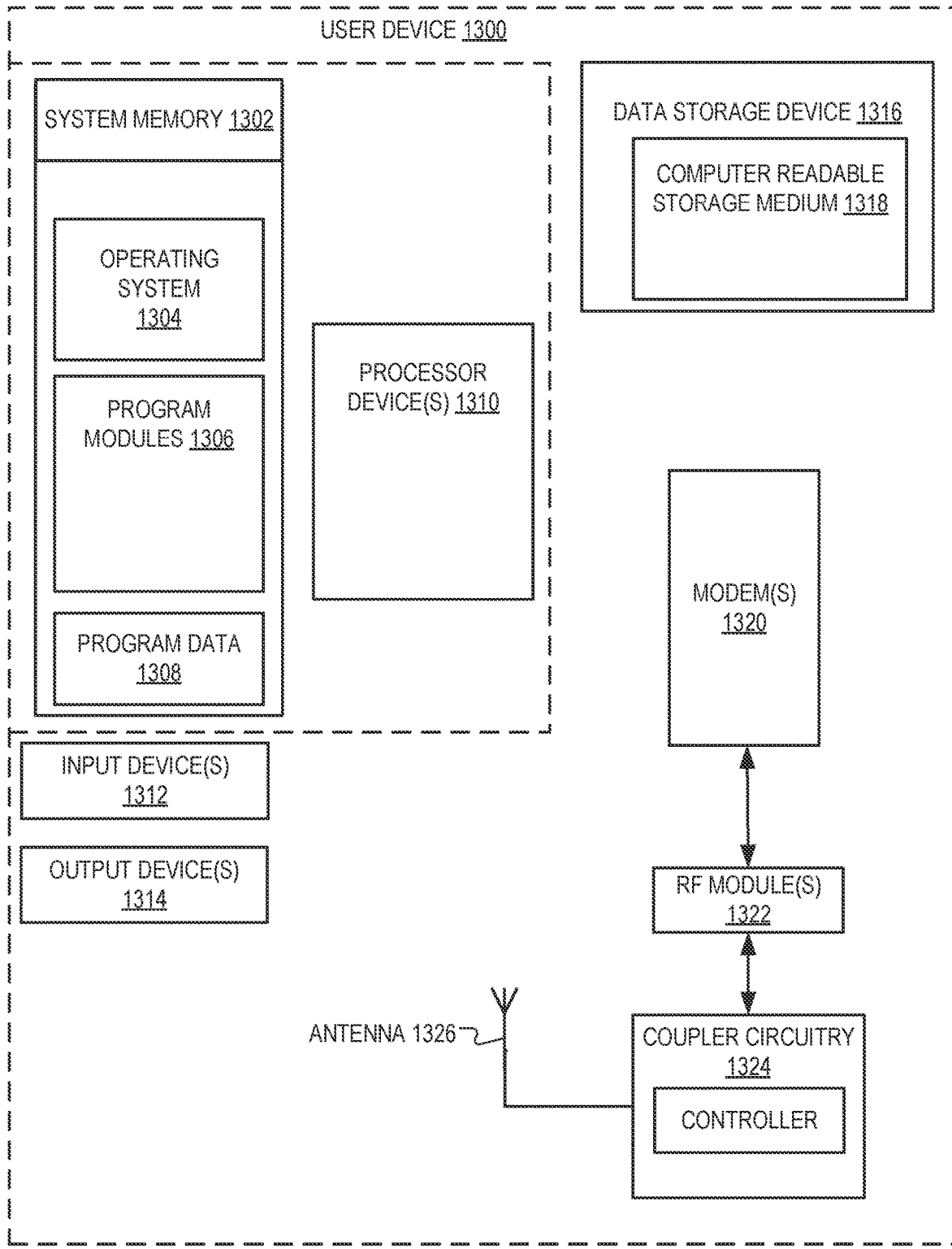
FIG. 13 is a block diagram of a user device with a processing device in which implementations of methods, systems, devices, or apparatuses in FIGS. 1A-12B may be implemented.

FIG. 13 is a block diagram of a user device 1300 with a processing device in which implementations of methods, systems, devices, or apparatuses in FIGS. 1A-11 may be implemented. The user device 1300 may display and/or implement the method and GUIs of FIGS. 1A-11. The user device 1300 may be any type of computing device such as an electronic book reader, a PDA, a mobile phone, a laptop computer, a portable media player, a tablet computer, a image capturing device, a video image capturing device, a netbook, a desktop computer, a gaming console, a DVD player, a computing pad, a media center, and the like. The user device 1300 may be any portable or stationary user device. For example, the user device 1300 may be an intelligent voice control and speaker system. Alternatively, the user device 1300 can be any other device used in a WLAN network (e.g., Wi-Fi® network), a WAN network, or the like.

The user device 1300 includes one or more processing device(s) 1310, such as one or more CPUs, microcontrollers, field programmable gate arrays, or other types of processing devices. The user device 1300 also includes system memory 1302, which may correspond to any combination of volatile and/or non-volatile storage mechanisms. The system memory 1302 stores information that provides operating system 1304, various program modules 1306, program data 1308, and/or other components. In one implementation, the system memory 1302 stores instructions. The user device 1300 performs functions by using the processing device(s) 1310 to execute instructions provided by the system memory 1302.

The user device 1300 also includes a data storage device 1316 that may be composed of one or more types of removable storage and/or one or more types of non-removable storage. The data storage device 1316 includes a computer-readable storage medium 1318 on which is stored one or more sets of instructions embodying any of the methodologies or functions described herein. Instructions for the program modules 1306 may reside, completely or at least partially, within the computer-readable storage medium 1318, system memory 1302 and/or within the processing device(s) 1310 during execution thereof by the user device 1300, the system memory 1302 and the processing device(s) 1310 also constituting computer-readable media. The user device 1300 may also include one or more input devices 1312 (keyboard, mouse device, specialized selection keys, etc.) and one or more output devices 1314 (displays, printers, audio output mechanisms, etc.).

The user device 1300 further includes modem 1320 to allow the user device 1300 to communicate via a wireless network(s) (e.g., such as provided by the wireless communication system) with other computing devices, such as remote computers, an item providing system, and so forth. The modem 1320 can be connected to zero or more RF modules 1322. The zero or more RF modules 1322 can be connected to zero or more coupler circuitry 1324. The RF modules 1322 and/or the coupler circuitry 1324 may be a WLAN module, a WAN module, PAN module, or the like. Antenna 1326 is coupled to the coupler circuitry 1324, which is coupled to the modem 1320 via the RF modules 1322. The modem 1320 allows the user device 1300 to handle both voice and non-voice communications (such as communications for text messages, multimedia messages, media downloads, web browsing, etc.) with a wireless communication system. The modem 1320 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi® technology, Long Term Evolution (LTE) and LTE Advanced (sometimes generally referred to as 4G), etc.

The modem 1320 may generate signals and send these signals to antenna 1326 via coupler circuitry 1324 as described herein. User device 1300 may additionally include a WLAN module, a GPS receiver, a PAN transceiver and/or other RF modules. The coupler circuitry 1324 may additionally or alternatively be connected to one or more of coupler arrays. The antenna 1326 may be configured to transmit in different frequency bands and/or using different wireless communication protocols. The antenna 1326 may be directional, omnidirectional, or non-directional antennas. In addition to sending data, the antenna 1326 may also receive data, which is sent to appropriate RF modules 1322 connected to the antenna 1326.

In one implementation, the user device 1300 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one implementation, the first wireless connection is associated with a first resonant mode of an antenna structure that operates at a first frequency band and the second wireless connection is associated with a second resonant mode of the antenna structure that operates at a second frequency band. In another implementation, the first wireless connection is associated with a first antenna element and the second wireless connection is associated with a second antenna element. In other implementations, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though modem 1320 is shown to control transmission and reception via the antenna 1326, the user device 1300 may alternatively include multiple modems, each of which is configured to transmit/receive data via a different antenna and/or wireless transmission protocol.

The user device 1300 delivers and/or receives items, upgrades, and/or other information via the network. For example, the user device 1300 may download or receive items from an item providing system. The item providing system receives various requests, instructions and other data from the user device 1300 via the network. The item providing system may include one or more machines (e.g., one or more server computer systems, routers, gateways, etc.) that have processing and storage capabilities to provide the above functionality. Communication between the item providing system and the user device 1300 may be enabled via any communication infrastructure. One example of such an infrastructure includes a combination of a wide area network (WAN) and wireless infrastructure, which allows a user to use the user device 1300 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected to the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 1300.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user device 1300 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1300 may include any type of content rendering devices such as electronic book readers, portable digital assistants, mobile phones, laptop computers, portable media players, tablet computers, image capturing devices, video image capturing devices, netbooks, notebooks, desktop computers, gaming consoles, DVD players, media centers, and the like.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present implementations are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other implementations will be apparent to those of skill in the art upon reading and understanding the above description. The scope of the present implementations should, therefore, be determined with reference to the appended claims, along with the full scope of equivalents to which such claims are entitled.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Although the implementations may be herein described with reference to specific integrated circuits, such as in computing platforms or microprocessing devices, other implementations are applicable to other types of integrated circuits and logic devices. Similar techniques and teachings of implementations described herein may be applied to other types of circuits or semiconductor devices. For example, the disclosed implementations are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital image capturing devices, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below.

Although the implementations are herein described with reference to a processing device or processing device, other implementations are applicable to other types of integrated circuits and logic devices. Similar techniques and teachings of implementations of the present invention may be applied to other types of circuits or semiconductor devices that may benefit from higher pipeline throughput and improved performance. The teachings of implementations of the present invention are applicable to any processing device or machine that performs data manipulations. However, the present invention is not limited to processing devices or machines that perform 512 bit, 256 bit, 128 bit, 64 bit, 32 bit, and/or 16 bit data operations and may be applied to any processing device and machine in which manipulation or management of data is performed. In addition, the following description provides examples, and the accompanying drawings show various examples for the purposes of illustration. However, these examples should not be construed in a limiting sense as they are merely intended to provide examples of implementations of the present invention rather than to provide an exhaustive list of all possible implementations of implementations of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or media devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

Implementations described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present implementations. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present implementations.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present implementations are not described with reference to any particular programming language. It will be appreciated that a variety of programming languages may be used to implement the teachings of the implementations as described herein.

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An image capturing subsystem, comprising:
a first image capturing device mounted to a mounting structure;
a second image capturing device mounted to the mounting structure; and
a third image capturing device mounted to the mounting structure,
wherein the first image capturing device, the second image capturing device, and the third image capturing device are arranged in an octahedral array for capturing a 360 degree image,
wherein the first image capturing device, the second image capturing device, and the third image capturing device face outward from a center of an octahedral shape that defines the octahedral array, and
wherein image data captured by the first image capturing device, the second image capturing device, and the third image capturing device are combined to generate the 360 degree image.

2. The image capturing subsystem of claim 1, wherein the 360 degree image is a first 360 degree image, wherein the octahedral array is a first octahedral array, wherein the octahedral shape is a first octahedral shape that defines the first octahedral array, wherein the mounting structure is a first mounting structure, the image capturing subsystem further comprising:
a fourth image capturing device mounted to a second mounting structure;
a fifth image capturing device mounted to the second mounting structure; and
a sixth image capturing device mounted to the second mounting structure,
wherein the fourth image capturing device, the fifth image capturing device, and the sixth image capturing device are arranged in a second octahedral array for capturing a second 360 degree image,
wherein the fourth image capturing device, the fifth image capturing device, and the sixth image capturing device face outward from a center of a second octahedral shape that defines the second octahedral array, and
wherein image data captured by the fourth image capturing device, the fifth image capturing device, and the sixth image capturing device are combined to generate the second 360 degree image.

3. The image capturing subsystem of claim 2, wherein the first octahedral array orients the first image capturing device, the second image capturing device, and the third image capturing device in a first direction, and wherein the second octahedral array orients the fourth image capturing device, the fifth image capturing device, and the sixth image capturing device in a second direction.

4. The image capturing subsystem of claim 3, wherein the first direction and the second direction are opposing each other by 180 degrees.

5. The image capturing subsystem of claim 4, wherein the image data captured by the first image capturing device, the second image capturing device, the third image capturing device, the fourth image capturing device, the fifth image capturing device, and the sixth image capturing device are combined to generate a spherical image.

6. The image capturing subsystem of claim 3, wherein the first direction is upward and the second direction is downward such that the first direction and the second direction are opposing each other by 180 degrees.

7. The image capturing subsystem of claim 6, wherein the image data captured by the first image capturing device, the second image capturing device, the third image capturing device, the fourth image capturing device, the fifth image capturing device, and the sixth image capturing device are combined to generate a spherical image.

8. The image capturing subsystem of claim 6, further comprising:
a seventh image capture device coupled to the second mounting structure, wherein the seventh image capture device is oriented in the downward direction.

9. The image capturing subsystem of claim 8, wherein the seventh image capture device receives the image data from the first image capturing device, the second image capturing device, the third image capturing device, the fourth image capturing device, the fifth image capturing device, and the sixth image capturing device, and wherein the seventh image capture device processes the received image data.

10. The image capturing subsystem of claim 3, wherein a single piece construction mounting structure includes the first mounting structure and the second mounting structure.

11. The image capturing subsystem of claim 1, wherein the mounting structure is secured to an unmanned aerial vehicle (UAV).

12. The image capturing subsystem of claim 11, wherein the UAV employs a plurality of motors that each rotate at least one propellor to fly the UAV that is remotely controlled by an individual.

13. The image capturing subsystem of claim 1, wherein the octahedral array for capturing 360 degree images orients the first image capturing device, the second image capturing device, and the third image capturing device in a downward direction such that the 360 degree image is oriented downward.

14. The image capturing subsystem of claim 13, wherein the first image capturing device, the second image capturing device, and the third image capturing device are used as a traffic sensor.

15. The image capturing subsystem of claim 13, wherein the first image capturing device, the second image capturing device, and the third image capturing device are used as terrestrial cameras.

16. A method of capturing images, comprising:
arranging a first image capturing device, a second image capturing device, and a third image capturing device coupled to a mounting structure in an octahedral array, wherein the first image capturing device, the second image capturing device, and the third image capturing device face outward from a center of an octahedral shape that defines the octahedral array;

receiving image data from the first image capturing device, the second image capturing device, and the third image capturing device; and generating a 360 degree image using the image data received from the first image capturing device, the second image capturing device, and the third image capturing device.

17. The method of claim 16, wherein the octahedral array is a first octahedral array, wherein the octahedral shape is a first octahedral shape that defines the first octahedral array, and wherein the generated 360 degree image is a first 306 degree image, the method further comprising:

arranging a fourth image capturing device, a fifth image capturing device, and a sixth image capturing device in a second octahedral array, wherein the fourth image capturing device, the fifth image capturing device, and the sixth image capturing device face outward from a center of a second octahedral shape that defines the second octahedral array;

receiving image data from the fourth image capturing device, the fifth image capturing device, and the sixth image capturing device; and generating a second 360 degree image using the image data received from the fourth image capturing device, the fifth image capturing device, and the sixth image capturing device.

18. The method of claim 17, further comprising:
generating a spherical image based on the first 360 degree image and the second 360 degree image.

\* \* \* \* \*